(12) United States Patent
Lee et al.

(10) Patent No.: US 7,822,161 B2
(45) Date of Patent: Oct. 26, 2010

(54) IMPULSE RADIO-BASED ULTRA WIDEBAND (IR-UWB) SYSTEM USING 1-BIT DIGITAL SAMPLER AND BIT DECISION WINDOW

(75) Inventors: Soon Woo Lee, Gyeonggi-do (KR);
Kwan Ho Kim, Gyeonggi-do (KR);
Young Jin Park, Gyeonggi-do (KR);
Won Tae Lee, Gyeonggi-do (KR); Hae Soo Park, Gyeonggi-do (KR)

(73) Assignee: Korea Electrotechnology Research Institute, Gyongsangnam-do (KR)

( * ) Notice: Subject to any disclaimer, the term of this patent is extended or adjusted under 35 U.S.C. 154(b) by 826 days.

(21) Appl. No.: 11/805,239

(22) Filed: May 22, 2007

(65) Prior Publication Data
US 2008/0056419 A1     Mar. 6, 2008

(30) Foreign Application Priority Data
Sep. 1, 2006     (KR) .................. 10-2006-0084117
Dec. 7, 2006     (KR) .................. 10-2006-0123468

(51) Int. Cl.
*H04L 7/00* (2006.01)
(52) U.S. Cl. ....................... 375/355; 375/256
(58) Field of Classification Search ............ 375/355, 375/219, 256, 130; 455/550.1
See application file for complete search history.

(56) References Cited
U.S. PATENT DOCUMENTS
4,641,317 A     2/1987     Fullerton

| 4,743,906 A | 5/1988 | Fullerton |
| 6,925,109 B2 | 8/2005 | Richards et al. |
| 2005/0018762 A1* | 1/2005 | Aiello et al. ............ 375/219 |
| 2005/0260952 A1* | 11/2005 | Santhoff et al. ............ 455/88 |

FOREIGN PATENT DOCUMENTS

| KR | 10-0470029 | 5/2004 |
| KR | 10-0520150 | 6/2005 |

* cited by examiner

*Primary Examiner*—Temesghen Ghebretinsae
(74) *Attorney, Agent, or Firm*—The Webb Law Firm

(57) ABSTRACT

An impulse radio-based ultra wideband communication system, using an ultra wideband impulse and a 1-bit high-speed digital sampler, includes a transmitting RF module, a receiving RF module, a signal recovery unit, a transmitting signal processor, a receiving signal processor, and an ultra wideband antenna. The transmitting RF module includes an integrated impulse generator capable of implementing on-off-keying modulation and pulse position modulation, and an amplifier for amplifying output of the integrated impulse generator. The receiving RF module includes a two stage envelope detector for detecting a received signal and a comparator for converting the detected signal into a rectangular pulse. The signal recovery unit restores the signal from the receiving RF module to a digital signal using the 1-bit digital sampler. The signal processor includes a receiving signal processor for synchronizing the digital signal and decoding the detected signal. The ultra wideband antenna transmits and receives an ultra wideband signal.

21 Claims, 17 Drawing Sheets

FIG.15
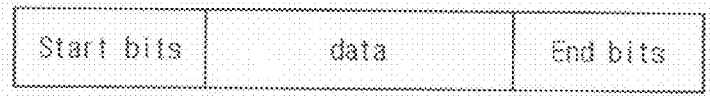
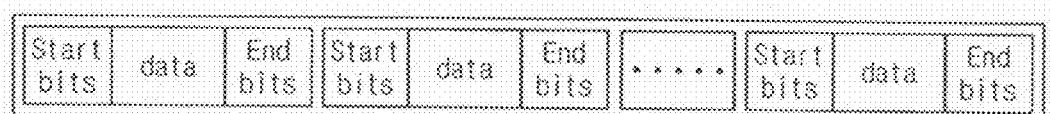
FIG.16
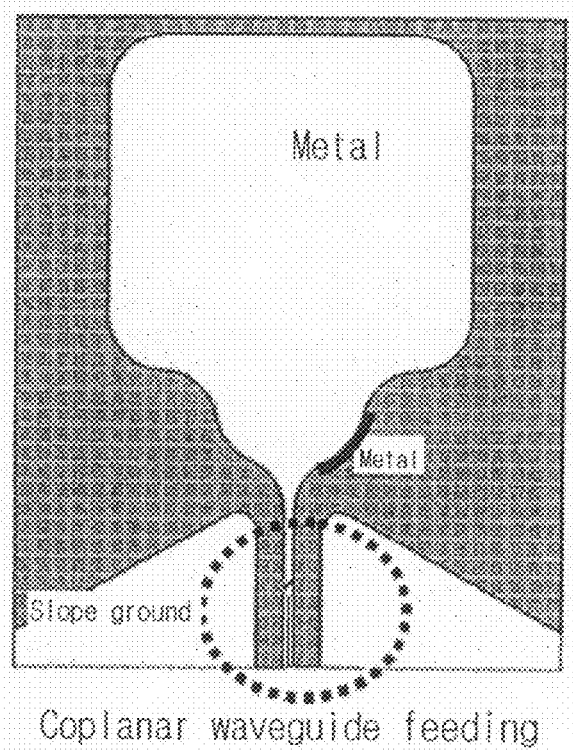

ured Coal et al. US 7,822,161 B2

IMPULSE RADIO-BASED ULTRA WIDEBAND (IR-UWB) SYSTEM USING 1-BIT DIGITAL SAMPLER AND BIT DECISION WINDOW

BACKGROUND OF THE INVENTION

1. Field of the Invention

The present invention relates generally to an impulse radio-based ultra wideband (IR-UWB) wireless communication system, and more particularly, to an IR-UWB communication system capable of performing communication at a rate of up to several Mbps in a local area of several tens of meter while consuming low power and supporting low complexity by way of a receiver based on energy detection scheme, a transmitter including an integrated impulse generator, and synchronization acquisition and tracking schemes using a 1-bit digital sampler and a bit decision window.

2. Description of the Related Art

Unlike a wireless communication system using a continuous sinusoidal wave, an impulse radio-based ultra wideband (IR-UWB) communication uses an impulse-like signal that has less than several nanosecond ($10^{-9}$ second) pulse width in time domain and an ultra wideband frequency spectrum in frequency domain. Since an IR-UWB system makes use of an extreme short pulse in time domain and does not require some RF components such as mixer, it has low complexity and its power consumption can be dramatically reduced. Thus, data communication of low power consumption up to several tens of Mbps is theoretically possible. Since an impulse is used, the IR-UWB communication can also be used in implementing a system having an exact time precision characteristic, and thus can be used in implementing a low power consumption/low data rate/high accurate ranging and precision positioning and tracking system.

As a first example of the prior art, the Korean Electrotechnology Research Institute disclosed a wireless communication transmitter using a method of generating Gaussian pulses and ON-OFF Keying (OOK) modulation (Korean Patent Number 1004700290000). The object of the invention is to simplify a device and reduce power consumption for transmission. The wireless communication transmitter includes a Gaussian mono cycle generator, a binary random data generator, a switching means, a filtering means, an amplification means, and an antenna. The Gaussian mono cycle generator generates ultra wideband pulses having a predetermined interval using the ultra wideband characteristics of a Gaussian mono cycle pulse in place of a continuous wave such as a sine wave, used as a carrier in a prior art wireless communication transmitter. The impulse is generated by a microprocessor or a rectangular wave generator at the rising edge of an input rectangular wave.

An ultra wideband pulse string generator (Korean Patent Number 1005201500000), disclosed by Samsung Electronics Co., Ltd., is a more simplified wireless communication system including a chip type impulse generator as a second example of the prior art. The second example of the prior art proposes a method of designing the chip type impulse generator, and includes using a latch to coerce an impulse generator to have a time interval in response to an input signal. The method relates to a signal generation method pertaining to a method of BPSK modulation, in which a signal is inverted each time a data value changes.

According to the prior art wireless communication systems, various impulse communication methods are essential in order to activate the UWB technique, but they have a problem that the construction of low complexity and low power consumption communication system is not simple because the first example is to use a module-based impulse generator and the second one is to need a complex IR-UWB receiver.

The other examples of the prior art are as follows: U.S. Pat. No. 6,925,109, issued by Aug. 2, 2005, U.S. Pat. No. 4,743,906, issued by May 10, 1988, and U.S. Pat. No. 4,641,317, issued by Feb. 3, 1987.

For IR-UWB system of low power consumption and low complexity from the viewpoint of implementation, chip-based impulse generation technology consuming low power and supporting low complexity is required. Also, in an ultra wideband impulse receiver, a digital signal recovery unit is the most important element in a fundamental arrangement. An ultra wideband signal in a time domain has a duration less than several nanoseconds ($10^{-9}$ second). Accordingly, the ultra wideband impulse may be converted into a digital signal through various methods. However, it is difficult to implement the conversion in practice due to the high complexity, cost, and power consumption of the system. Consequently, the prior art impulse communication systems do not provide a new method for restoring an ultra wideband impulse signal to a digital signal, and instead use a general ultra wideband high-speed analog-to-digital converter (ADC). In most cases, the bandwidth of an impulse is equal to or greater than 500 MHz, and thus the ADC should have a bandwidth greater than 1 GHz. Since the prior art impulse communication systems use a high-speed ADC having a bandwidth greater than 1 GHz and a sample rate of several Gsps (samples per second) and a precise phased lock loop (PLL), they require an expensive device and use a lot of power to manage the expensive device.

Furthermore, since exact time synchronization with respect to impulse signals requires a complicated synchronizing circuit, and reduces the advantages of the ultra wideband impulse system having low cost and low power consumption characteristics, in signal processing, simple detection and tracking technology of recovered symbol is very important.

SUMMARY OF THE INVENTION

Accordingly, the present invention has been made keeping in mind the above problems occurring in the prior art, and an object of the present invention is to provide an impulse radio-based ultra wideband wireless communication system that has low cost and low power consumption characteristics, using an integrated impulse generator capable of supporting simpler OOK and pulse position modulation (PPM), an impulse detection scheme in receiving unit based on impulse amplitude detection, a digital signal recovery unit using a 1-bit digital sampler, and signal synchronization and tracking schemes based on a bit decision window. In particular, a signal processing configuration for the overall system is provided so that a practical impulse radio-based ultra wideband communication system having intermediate-low data rate, low power consumption and low complexity can be developed, with the result that the system can be used in controlling home network appliances, sensor networks, low power UWB-RFID, and intermediate-low data rate local area personal communication devices.

In order to accomplish the above object, the present invention provides an impulse radio-based ultra wideband communication system using an ultra wideband impulse and a 1-bit digital sampler, comprising a transmitting RF module comprising an integrated impulse generator capable of implementing on-off-keying (OOK) modulation or pulse position modulation (PPM), and an amplifier for amplifying output of the integrated impulse generator; a transmitting signal processor for impulse modulation or pulse mapping; a receiving RF module including a two stage envelope detector for detecting an envelope of a received impulse signal and a comparator for converting the detected signal into a rectangular pulse; a digital signal recovery unit for restoring the signal from the receiving RF module to a digital signal using the 1-bit digital sampler; a receiving signal processor for synchronizing the digital signal and tracking symbol synchronization; and an ultra wideband antenna for transmitting and receiving an ultra wideband impulse signal.

Preferably, the 1-bit digital sampler includes a clock generator having a time delay component and a pulse detector for detecting the rectangular pulse. The clock generator generates a sequence of clock signals in parallel equally phased from each other from a system clock by gradually delaying the system clock and the pulse detector detects the rectangular pulse by applying the sequence of clock signals to the rectangular pulse. The clock generator includes a time delay or phase conversion element, and generates a plurality of system clocks having a predetermined time/phase difference therebetween, and the plurality of system clocks are arranged in parallel.

More preferably, the integrated impulse generator of the transmitting RF module includes a D latch for receiving n bits of data to be transmitted through at least on input terminals; an AND gate for performing an AND operation on an output signal of the D latch and a signal obtained by delaying the output signal of the D-latch by a predetermined time; and an inverter chain for performing current driving in order to prevent the distortion of the output signal of the D latch.

The D latch outputs an impulse signal each time a data signal is present by fixing one input terminal to digital logical value 'HIGH' when data to be transmitted is applied to another input terminal.

The receiving RF module includes a wideband band-pass filter (BPF) for preventing interference of adjacent frequencies among the signals received from the ultra wideband antenna; a low noise amplifier (LNA) for low-noise-amplifying a filtered signal passed through the wideband BPF; an active attenuator for controlling amplitude of the amplified signal from the LNA; and an automatic gain control amplifier for amplifying the signal passed through the active attenuator, wherein the two stage envelope detector converts the RF signal, amplified by the automatic gain control amplifier, into the rectangular pulse.

The transmitting signal processor includes transmission data memory for temporarily storing data to be transmitted; a forward error correction encoder for performing forward error correction; a start and end bits generator for generating start and end signals indicating the start and end of a data packet to be transmitted; a multiplexer for selecting data to be transmitted and control data; transmission memory for storing data from the multiplexer; and a pulse mapper for performing OOK or PPM modulation and transforming a waveform of receiving data into a waveform suitable for the input of the impulse generator.

Most preferably, the transmitting signal processor further includes a controller for applying a control signal to respective elements so as to control transfer flow of the entire signals.

Also, the receiving signal processor includes a symbol synchronizer for processing signal synchronization and synchronization tracking for the digital signal recovered by the signal recovery unit; a start/end bits checker for checking a start and end of transmitted data; receiving data memory for storing the transmitted data; a FEC decoder for decoding the signal encoded in the transmitting signal processor; and receiving memory for storing recovered original data.

Preferably, the receiving signal processor further includes a controller for applying a control signal to respective elements so as to control the transfer flow of the entire signals.

Further, the ultra wideband antenna is a square monopole antenna, which is printed in a stepped pattern on a section of a printed circuit board having a sloped ground surface, and has a coplanar waveguide feeding. The ultra wideband antenna is formed by inserting a triangular or rectangular transition in a power feed portion so that it has wideband characteristics.

Moreover, the digital sampler of the signal recovery unit is a 1-bit digital sampler, and the symbol synchronizer performs the first step of removing noise present in a quantized input signal passed through the 1-bit digital sampler, the second step of estimating a synchronization time point in the signal from which the noise has been removed, and the third step of determining the synchronization time point by verifying the estimated synchronization time point, thereby achieving symbol synchronization of an input signal through the respective steps.

Preferably, the symbol synchronizer includes a correlator for increasing a signal to noise ratio (SNR) of the quantized input signal of the 1-bit digital sampler; the first step is to remove a signal lower than a predetermined magnitude from the quantized input signal using the correlator, the second step is to extract sample groups from the signal from which the noise has been removed, to search for a sample having the greatest value in a first of the sample groups, and to estimate the searched sample as the synchronization time point, the third step is to define a bit decision window in each symbol and accept the estimated synchronization time point as the synchronization time point through a verification process for testing whether the symbol is included within a predetermined range while moving the bit decision window from the estimated synchronization time point to a time point of preset number of times a predetermined frame time.

More preferably, the correlator is m(n) which satisfies the following Equation (1), and the first step is to remove a signal less than a predetermined value of $T_h$ from a quantized $\tilde{r}(n)$ using the correlator M(n) in order to increase a SNR of the $\tilde{r}(n)$ quantized by the 1-bit digital sampler, $$\tilde{r}_m(n) = t(n) \cdot \{\tilde{r}(n) \otimes m(n)\} \quad (1)$$

$$\begin{cases} m(n) = 1, & 0 \leq n \leq N_m \\ \phantom{m(n)} = 0, & \text{otherwise} \end{cases}$$

$$\begin{cases} t(n) = 1, & \text{if } (\tilde{r}(n) \otimes m(n)) \geq T_h \\ \phantom{t(n)} = 0, & \text{otherwise} \end{cases}$$

where m(n) is a rectangular correlator having a size of 1, $N_m$ is the width of the filter, $T_h$ is a threshold value for determining the removal of noise components, and the notation $<\otimes>$ denotes the convolution product.

The second step defines a sample group, having an independent or continuous value higher than zero in the signal $\tilde{r}_m(n)$ from which noise has been removed, as an 'island'; to calculate a sample having a greatest value in each sample group 'island' and define the sample as a 'flag'; and to estimate the index $n_{flag,1}$ of a sample 'flag' having the greatest value in the 'island' of the first of the sample groups to be the synchronization time point.

The third step is to define a bit decision window (BDW) of $BDW_i$ having a predetermined width $N_{BDW}$ centered around a time point of $(n_{flag,1}+i \cdot N_f)$, that is, a predetermined frame time $i \cdot N_f$ after the estimated synchronization time point $n_{flag,1}$; to check whether there is a symbol having a value higher than zero in each BDW while moving the center $BDW_{cen,i}$ of the BDW to a time point of a preset number of $N_i$ times a frame interval $N_f$ according to the following Equation (2); and to regard the estimated $n_{flag,1}$ as an exact synchronization time point $n_{acq}$ when there is a continuous symbol having a value higher than zero in the BDW, $$BDW_i=[BDW_{cen,i}-N_{BDW}/2, BDW_{cen,i}+N_{BDW}/2] \quad (2)$$

where $BDW_{cen,i}=n_{flag,1}+i \cdot N_f$ $(i=1, 2, \ldots, N_i)$.

The center $BDW_{cen,i}$ of the $BDW_i$ is moved to a time point of a preset number of $N_i$ times a frame interval $N_f$, and when only zero is present at any one BDW, the second step and the third step are repeatedly performed from the next sample to the time at which synchronization is achieved.

$BDW_{cen,1st}$ for the first symbol after a time period of synchronization acquisition is determined based on a synchronization acquisition time $n_{acq}$ and satisfies the following Equation (3), the center $BDW_{cen,k+1}$ of $BDW_{k+1}$ for the $(k+1)^{th}$ symbol is determined based on the previous time point $BDW_{cen,k}$ and an offset $\Delta_{k+1}$ and satisfies the following Equation (4), the offset $\Delta_{k+1}$ being the difference between a sample index $n_{flag,k}$ having a greatest value in the $k^{th}$ window $BDW_k$ and the center index $BDW_{cen,k}$ of the $BDW_k$, and the acquired synchronization is tracked using the $BDW_{cen,1}$ and the $BDW_{cen,k+1}$, $$BDW_{cen,1st}=n_{acq}+\alpha \cdot N_f \quad (3)$$

where $\alpha$ is the total number of symbols in a synchronization acquisition time period, $$BDW_{cen,k+1}=(BDW_{cen,k}+N_f)+\Delta_{k+1} \quad (4)$$

where $\Delta_{k+1}=n_{flag,k}-BDW_{cen,k}$.

Furthermore, the offset $\Delta_{k+1}$ is regarded as zero if the sample index $n_{flag,k}$ is not found because no symbol is present in the $k^{th}$ sample group.

In addition, the symbol synchronization is achieved and the BDW is set for each symbol through subsequent synchronization tracking, and a bit is identified in each BDW in such a way that, when a sample higher than zero is present in the BDW for the signal $\tilde{r}_m(n)$, it is determined that the signal $\tilde{r}_m(n)$ is "1 (ON)", and, if only zero is present in the BDW, it is determined that the signal $\tilde{r}_m(n)$ is "0 (OFF)".

BRIEF DESCRIPTION OF THE DRAWINGS

The above and other objects, features and advantages of the present invention will be more clearly understood from the following detailed description taken in conjunction with the accompanying drawings, in which:

FIG. 15 is a diagram showing an embodiment of a data transmission protocol in the IR-UWB wireless communication system according to the present invention;

FIG. 16 is a sectional view showing an embodiment of an ultra wideband antenna used in the IR-UWB wireless communication system according to the present invention;

FIG. 18 is a view showing an example of an input signal received from an ultra wideband antenna, which includes an impulse signal and noise, FIG. 19 is a view showing signals passed through an amplifier and an envelope detector using an ultra wideband impulse receiver according to the present invention, FIG. 20 is a view showing a signal digitized using a 1-bit digital sampler according to the present invention, FIG. 21 is a view showing the output of a digital correlator according to the present invention, FIG. 22 is a view showing a bit decision window and an initial synchronization acquisition procedure according to the present invention, and FIG. 23 is a view showing a symbol synchronization tracking procedure using a bit decision window according to the present invention.

DESCRIPTION OF THE PREFERRED EMBODIMENT

An impulse radio-based ultra wideband (IR-UWB) wireless communication system according to an embodiment of the present invention will be described in detail with reference to the accompanying drawings. The impulse radio-based ultra wideband (IR-UWB) wireless communication system can perform OOK or PPM modulation using an impulse signal. Furthermore, the IR-UWB wireless communication system is a low complexity system that employs synchronization acquisition and synchronous tracking methods using a 1-bit digital sampler and a bit decision window.

Figure 1:
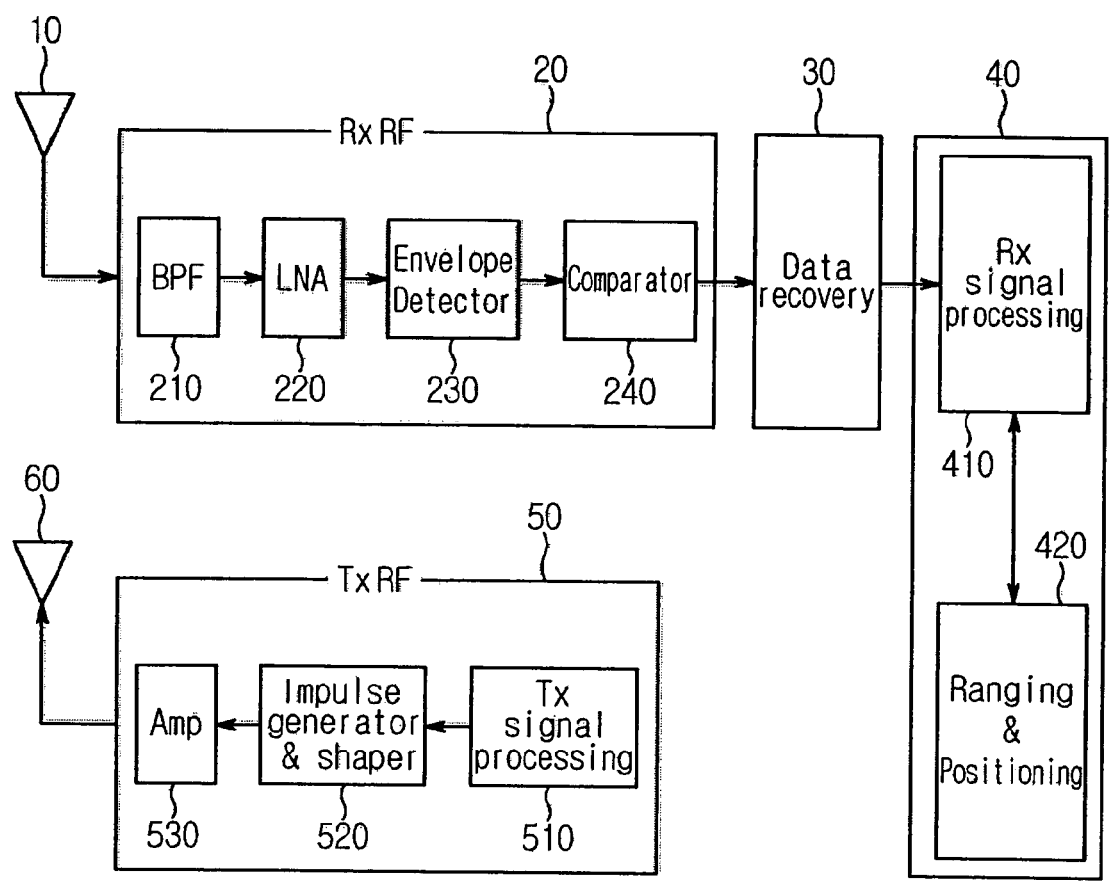
FIG. 1 is a schematic block diagram showing an impulse radio-based ultra-wideband (IR-UWB) wireless communication system according to an embodiment of the present invention.

FIG. 1 is a schematic block diagram showing an IR-UWB wireless communication system according to an embodiment of the present invention.

As shown in FIG. 1, the schematic block diagram showing the IR-UWB wireless communication system according to the present invention may include an ultra wideband receiving antenna 10, a receiving RF module 20, a signal recovery unit 30 using a 1-bit digital sampler, a signal processor 40, a transmitting RF module 50, and a transmitting antenna 60.

In more detail, the transmitting RF module 50 includes a transmission signal processor 510, an impulse generator and shaper 520, and an ultra wideband amplifier 530. The transmission signal processor 510 includes a pulse mapper for embodying an OOK and PPM modulation method. The impulse generator and shaper 520 are formed of an ultra wideband impulse generator and a band-pass filter. The ultra wideband amplifier 530 amplifies the output of the impulse generator and shaper 520.

The receiving RF module 20 includes a band-pass filter (BPF) 210, a low noise amplifier (LNA) 220, a two stage envelope detector 230, and a comparator 240. The BPF 210 passes only a signal within a specific frequency range, among various receiving signals. The LNA 220 low-noise-amplifies a filtered signal. The two stage envelope detector 230 detects the envelope of the amplified signal. The comparator 204 converts the detected envelope signal into a rectangular pulse. Meanwhile, the signal recovery unit 30 restores an RF signal passed through the receiving RF module 20 to a digital signal.

The signal processor 40 includes a receiving signal processor 410 and a ranging & positioning device 420, which acquire synchronization and perform decoding for the signal recovered and detected in the signal recovery unit 30.

The embodiment of the ultra wideband communication system according to the present invention uses a noncoherent method of restoring a signal using the amplitude of a receiving impulse, and proposes an integrated impulse generator structure capable of implementing simple OOK and PPM modulation methods.

Figure 2:
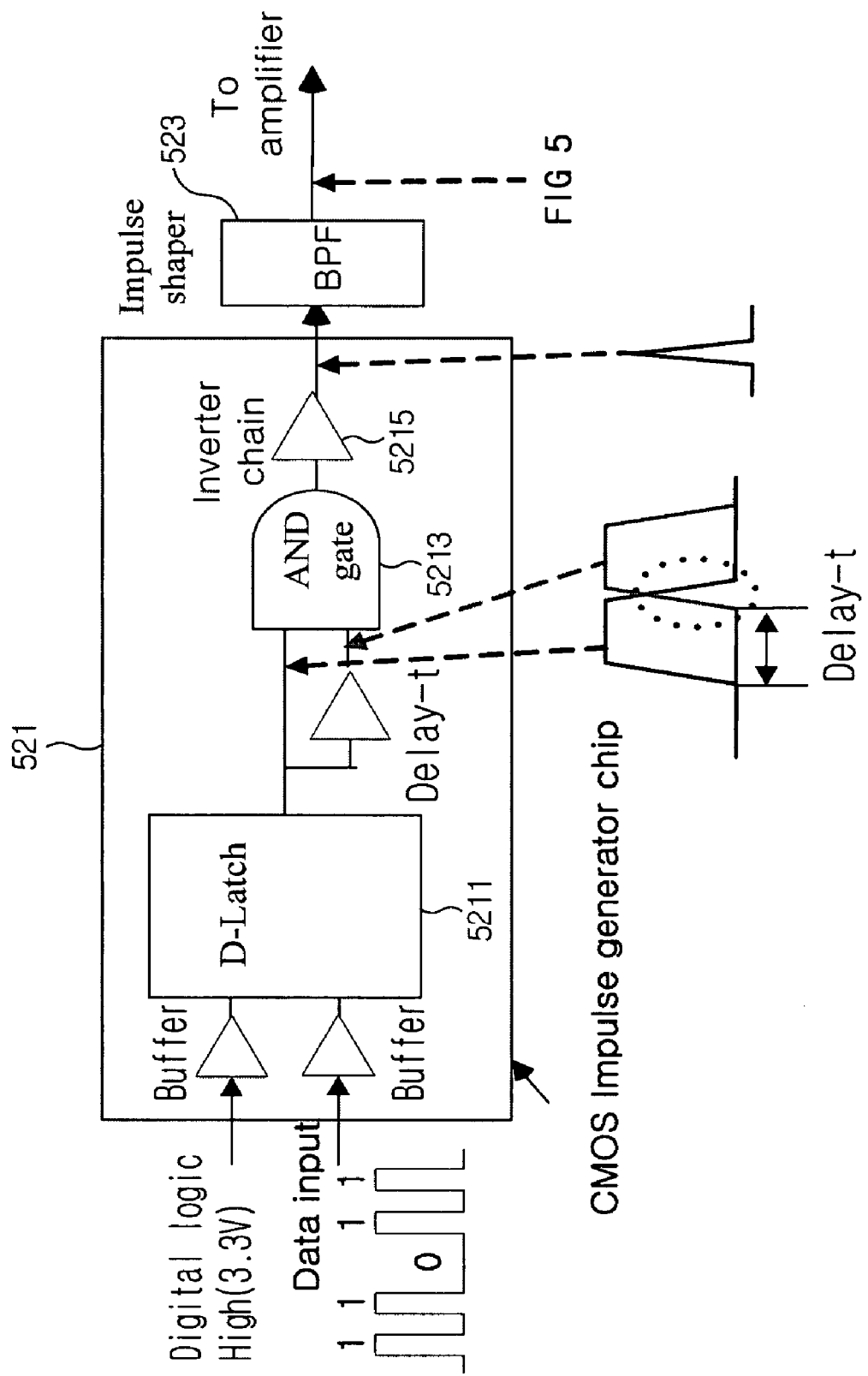
FIG. 2 is a view showing an example of the integrated impulse generator of the transmitting RF module of the IR-UWB wireless communication system shown in FIG. 1.

FIG. 2 is a view showing an example of the integrated impulse generator of the transmitting RF module of the IR-UWB wireless communication system shown in FIG. 1.

As shown in FIG. 2, the impulse generator & shaper 520 of the transmitting RF module 50 are formed of an integrated impulse generator 521 and an impulse shaper 523. The integrated impulse generator 521 includes a D latch 5211, an AND gate 5213, and an inverter 5215. The D latch 5211 includes one input terminal for receiving n bits of data to be transmitted and the other input terminal having a fixed high digital logic value (3.3V). The AND gate 5213 performs an AND operation on the signal output from the D latch 5211 and a signal obtained by delaying the output signal by a predetermined time. When one input of the D latch 5211 is fixed to digital logic 'h' and a data signal is applied to the other input thereof, the D latch 5211 outputs an impulse signal each time the data signal is input thereto. An ultra wideband triangular pulse is obtained through the AND gate 5213 using the impulse signal and the signal obtained by delaying the impulse signal by a predetermined time t. An output unit uses an inverter chain 5215 for current driving so as to prevent the distortion of a triangular pulse signal. The output impulse of the impulse generator 521 is converted into a signal suitable for the regulations of the allocated frequency band and the spectrum mask for ultra wideband applications through an impulse shaper 523, which is a band-pass filter, is amplified in the ultra wideband amplifier 530, and is transmitted through an ultra wideband transmitting antenna 60. Since the present invention can be embodied using the construction simpler than that of the prior art impulse generation method, the overall cost and complexity of a system can be definitely reduced.

Figure 3:
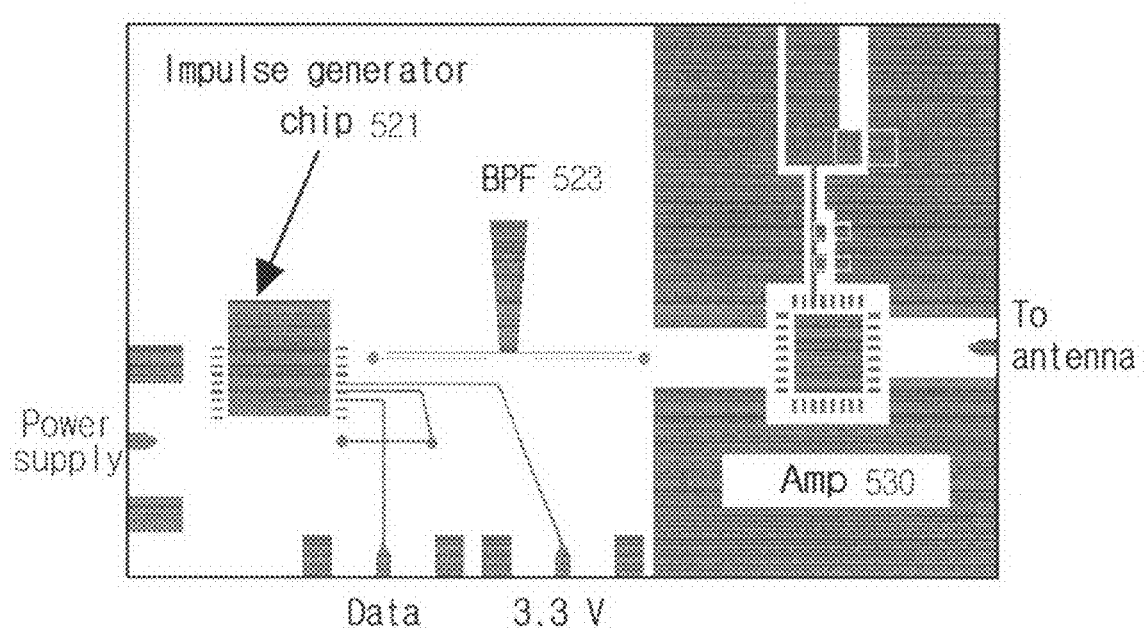
FIG. 3 is a view showing the transmitting RF module including an impulse generator chip according to the embodiment of FIG. 2, printed on a printed circuit board.
Figure 4:
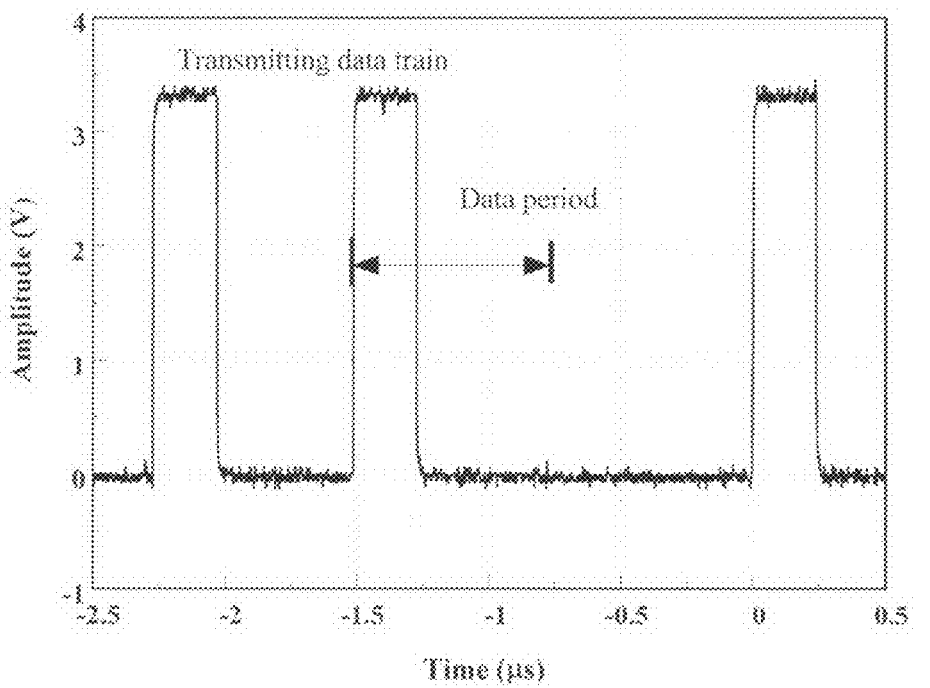
FIG. 4 is a view showing data output from the transmission signal processor of the transmitting RF module according to the embodiment of FIG. 1.
Figure 5:
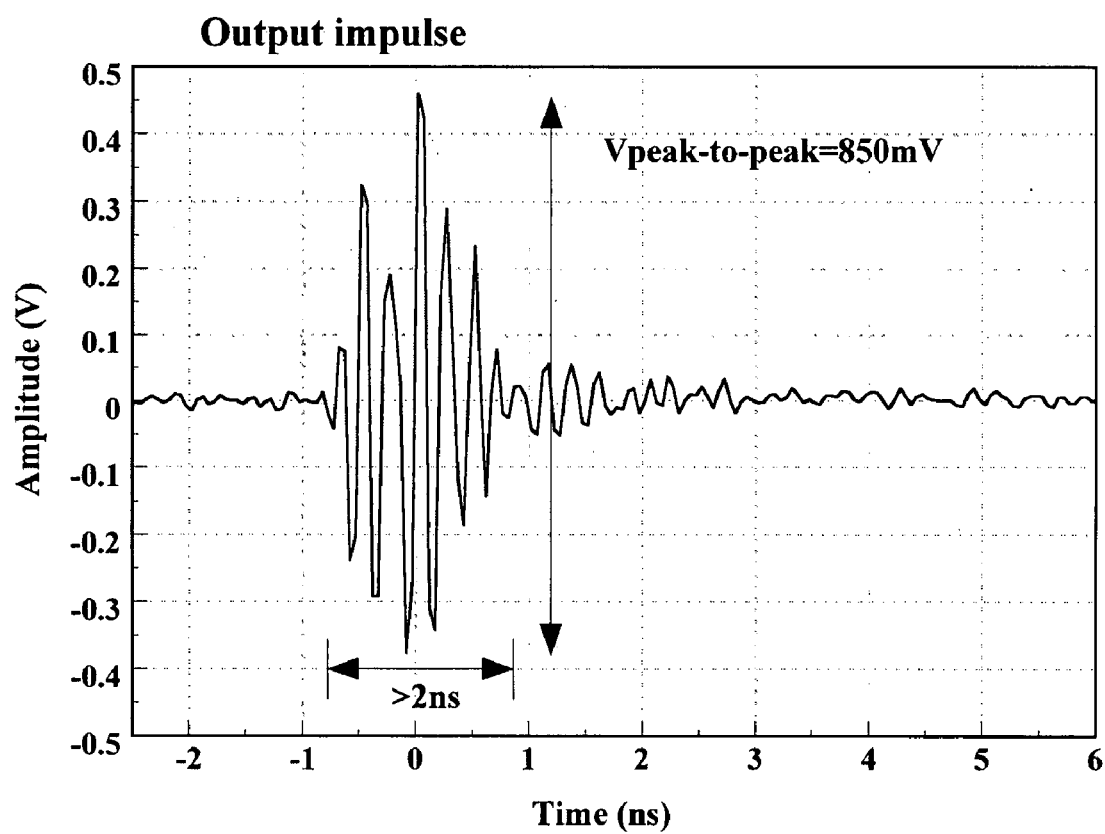
FIG. 5 is a view showing an impulse that is output through a band-pass filter in the transmitting RF module according to the embodiment of FIG. 2.

FIG. 3 is a view showing the transmitting RF module that is printed on a printed circuit board. FIG. 4 is a view showing data output from the transmission signal processor 510 of the transmitting RF module 50 according to the embodiment of FIG. 1. As shown in FIG. 4, data from the transmission signal processor 510 is converted into a return to zero (RZ) signal by the pulse mapper. FIG. 5 is a view showing an impulse that is actually obtained when the input signal of FIG. 4 passes through the impulse generator 521 and the band-pass filter 523.

Figure 6:
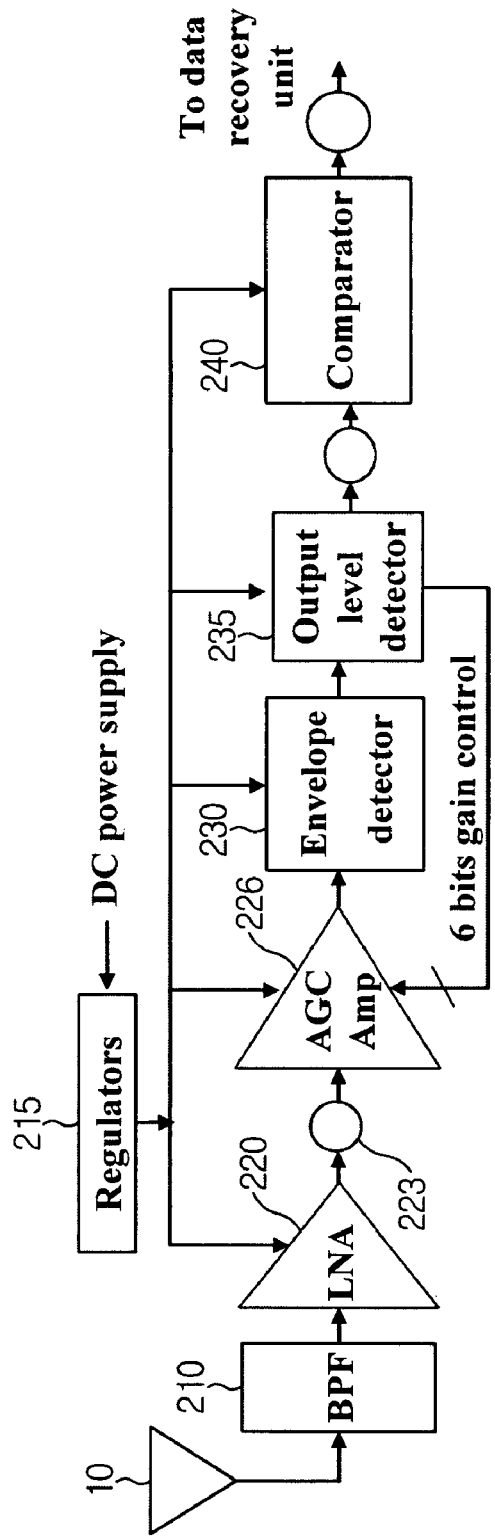
FIG. 6 is a view showing the construction of the receiving RF module of the IR-UWB wireless communication system.

FIG. 6 is a view showing the construction of the receiving RF module of the IR-UWB wireless communication system.

As shown in FIG. 6, the receiving RF module 20 includes a wideband band-pass filter 210, a low noise amplifier 220, an active attenuator 223, an automatic gain control amplifier 226, a two-stage envelope detector 230, and a comparator 240. The wideband band-pass filter 210 prevents the interference of adjacent frequencies among the signals received from the ultra wideband antenna. The low noise amplifier 220 low-noise-amplifies a filtered signal passed through the wideband band-pass filter 210. The active attenuator 223 controls the amplitude of the amplified signal output from the low noise amplifier 220. The automatic gain control amplifier 226 amplifies the signal passed through the active attenuator 223. The two stage envelope detector 230 detects the envelope of the RF signal amplified by the automatic gain control amplifier 226. The comparator 240 converts the detected envelope signal into a rectangular pulse. In the receiving RF module 20, a low noise amplifier 220 amplifies a modulated signal, received from the receiving antenna 10, the active attenuator 223 controls the amplitude of the signal while maintaining the waveform thereof, and the AGC amplifier 226 adjusts the amplitude thereof to a value within the range from 2 to 34 dB. The amplified impulse signal is converted into a rectangular pulse through the two stage envelope detector 230 and the comparator 240.

Using regulators 215, DC power is supplied to each structural element of the receiving RF module 20. The comparator 240 has a reference voltage greater than several tens of millivolt (mV), and is designed such that the voltage level of the comparator 240 is adjusted according to a control signal from the regulators 215. When a detected envelope signal equal to or greater than the reference voltage is input for a time longer than a predetermined time, the comparator 240 outputs a rectangular pulse having a width greater than several nanoseconds. At this time, in order to obtain a clean waveform by increasing the width of the rectangular pulse signal, one more envelope detector and comparator stage can additionally be installed.

Figure 7:
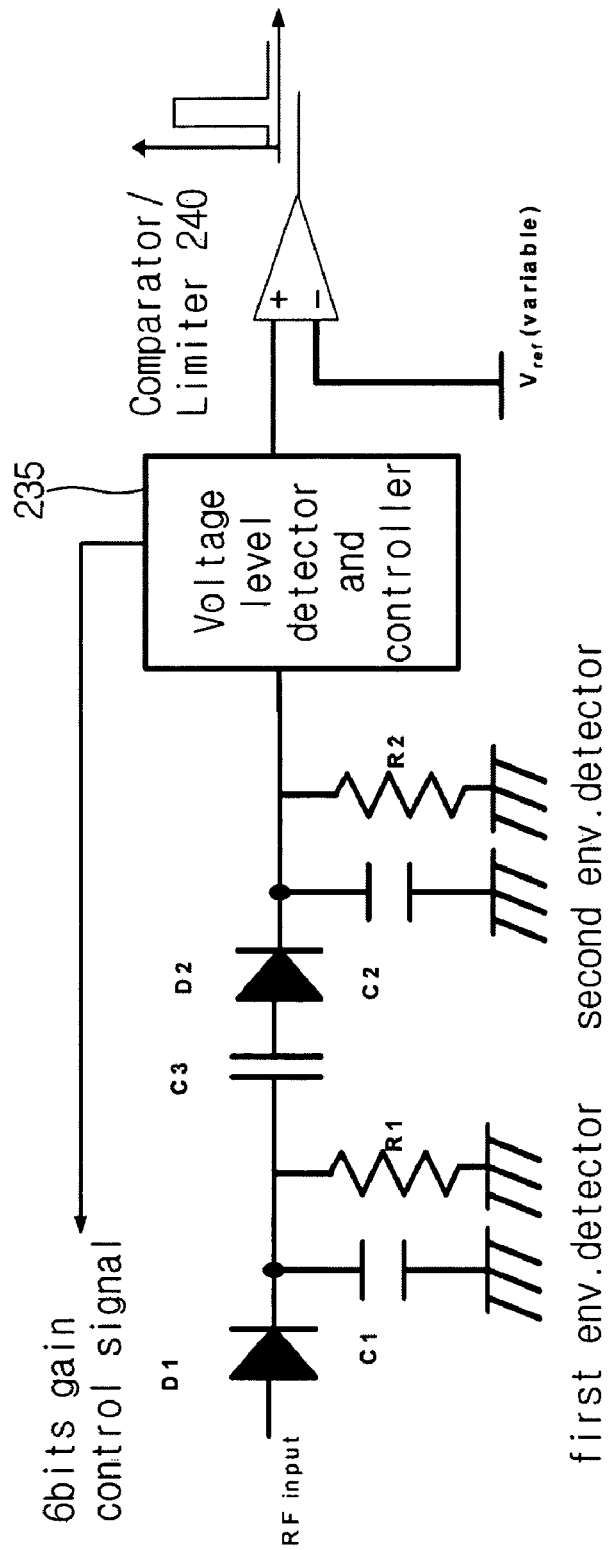
FIG. 7 is a view showing two-stage envelope detectors and a comparator implemented in the receiving RF module of the IR-UWB wireless communication system according to the present invention.

FIG. 7 is a view showing two-stage envelope detectors and a comparator implemented in the receiving RF module of the IR-UWB wireless communication system according to the present invention, shown in FIG. 6. As shown in FIG. 7, the comparator 7 may have a variable reference voltage. The peak value of a signal input to the comparator 240 may be measured by a voltage level detector and controller 235, and may be used to control the amplification rate of the AGC amplifier 226.

Figure 8:
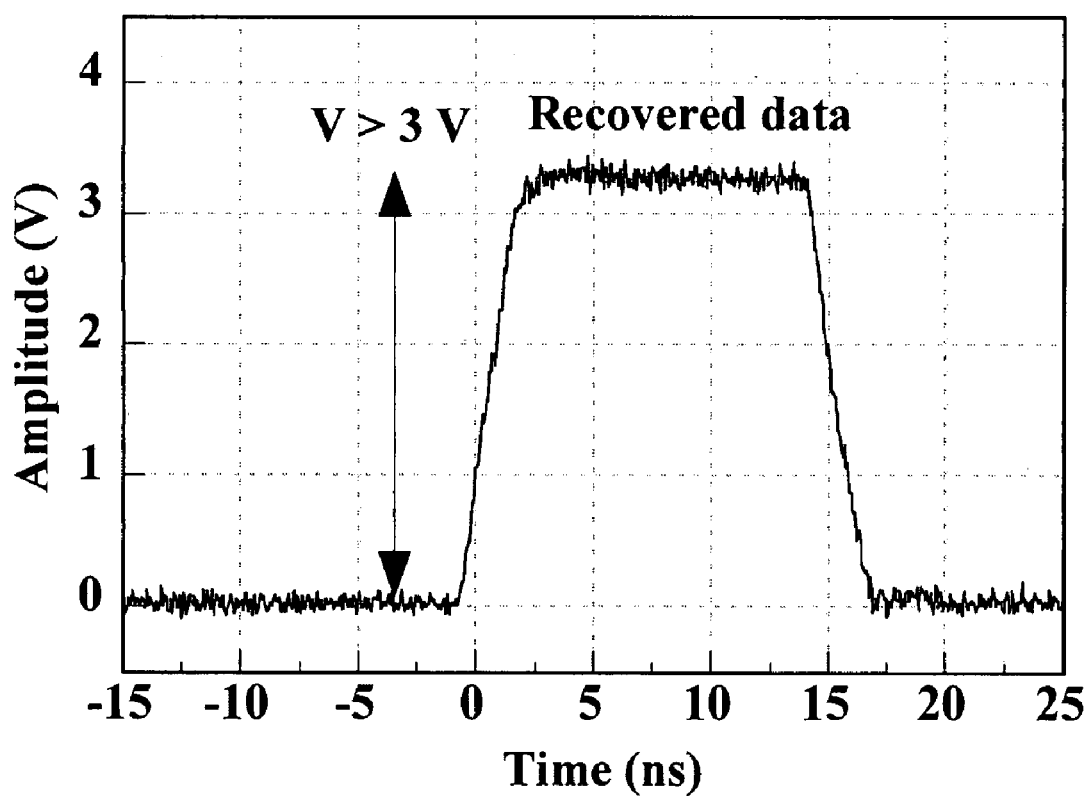
FIG. 8 is a graph showing a rectangular impulse waveform measured through the receiving RF module of an embodiment of FIG. 6.

FIG. 8 is a graph showing a rectangular impulse waveform measured through the receiving RF module shown in FIGS. 6 and 7.

Figure 9:
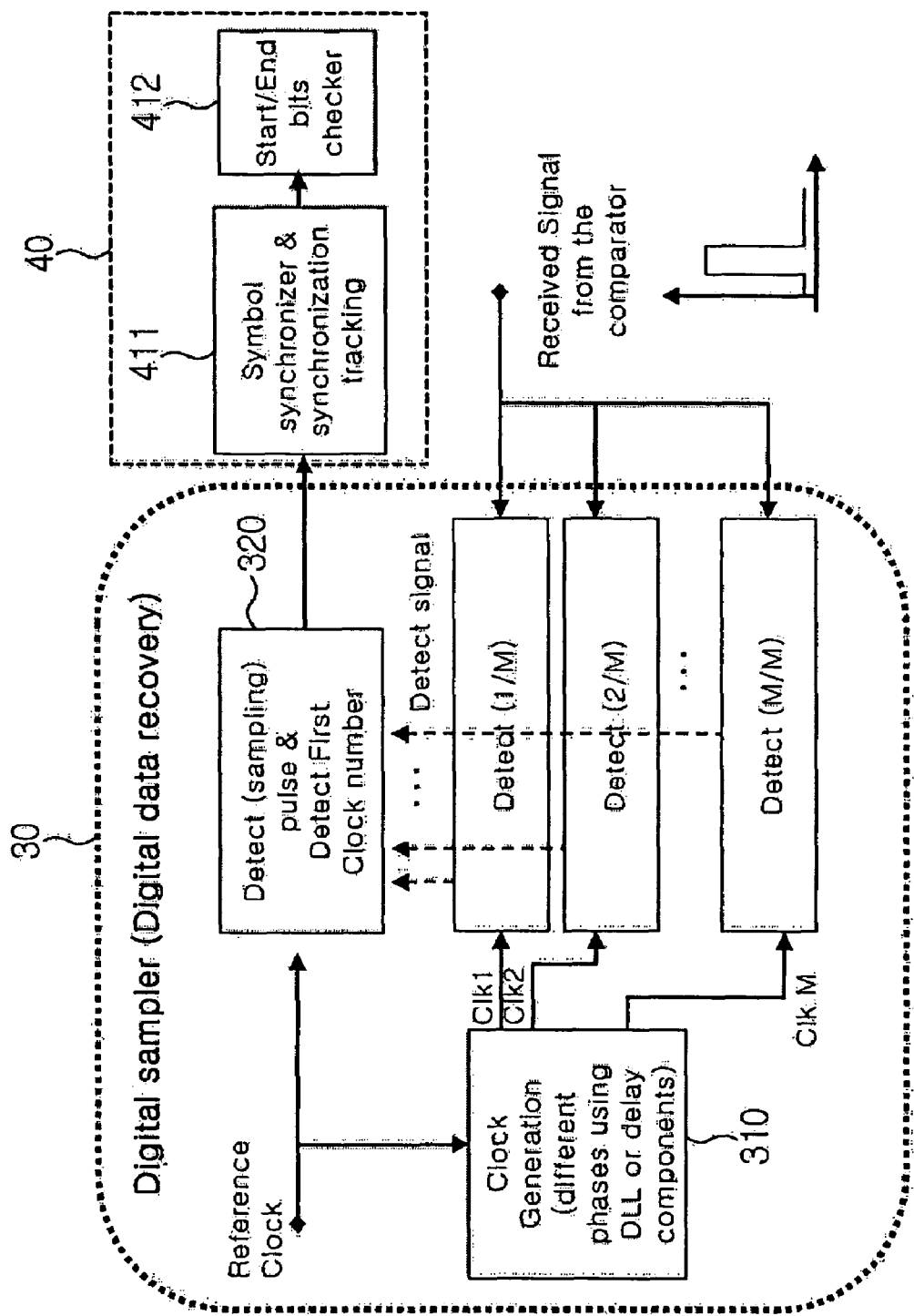
FIG. 9 is a view showing the construction of a digital signal recovery unit using the 1-bit digital sampler of the IR-UWB wireless communication system according to the present invention.

FIG. 9 is a view showing the construction of a digital signal recovery unit using the 1-bit digital sampler of the IR-UWB wireless communication system according to the present invention.

Figure 10:
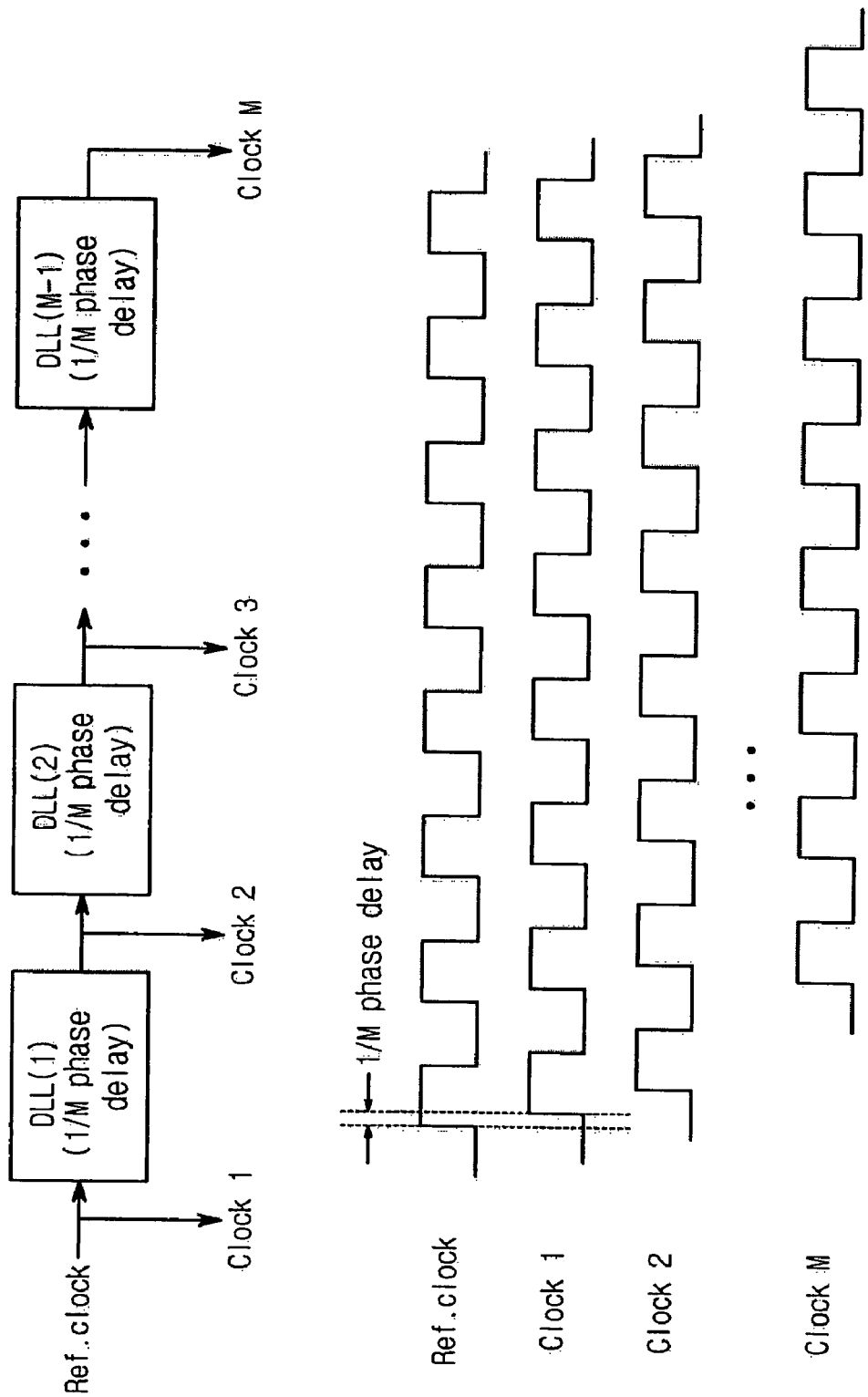
FIG. 10 is a view showing the construction and output waveform of the clock generator of the IR-UWB wireless communication system according to the present invention.

The 1-bit digital sampler 30 includes a clock generator 310 that has time delay components and delays the existing system clock little by little so that it generally works as a high-speed clock, and a pulse detector that applies the high-speed clock to a received signal and thus detects a rectangular pulse in the output of the comparator. This can be referred to as 'a time interleaving arrangement', which delays the existing system clock little by little using a clock generator 310 having a time delay component, thus generally having a high-speed clock. In detail, the clock generator 310 may use an inverter having a relatively precise delay time as a delay component or obtains a desired clock while changing the phase of an existing system clock. First, the clock generator 310 generates a system reference clock having a relatively low repetitive frequency and a plurality of clocks identical to a system clock having a predetermined time difference (within a system clock period)/phase difference (within 360 degrees) using time delay or phase conversion components. Furthermore, the clock generator 310 arranges a plurality of time-delayed/phase-changed system clocks in order to detect a signal, like the rectangular pulse output from the comparator. Respective signal detectors exist for the detection of the plurality of system clocks generated by the clock generator 310, and are provided in parallel with each other. When a signal is detected by at least one of a plurality of signal detectors, it is determined that data have been received. The above-described clock generator 310 is illustrated in detail in FIG. 10. The clock generator 310 enables a short pulse to be sampled at high speed by generating a plurality of clocks having slightly different phases using a plurality of Delay-Locked Loops (DLL).

A pulse detection signal processor 320 selects only a first clock from among detected time-delayed/phase-changed system clocks, and then disregards signals detected at the rising/falling edges of another clock during one time period. The reason for selecting such a method is that an impulse propagation channel has a signal delay profile greater than approximately 20 nanoseconds in a multiple path environment, so that the 1-bit digital sampler detects impulse signals at least two time-delayed clocks, with the result that the 1-bit digital sampler needs to be coerced to recognize one signal during one time period.

Figure 11:
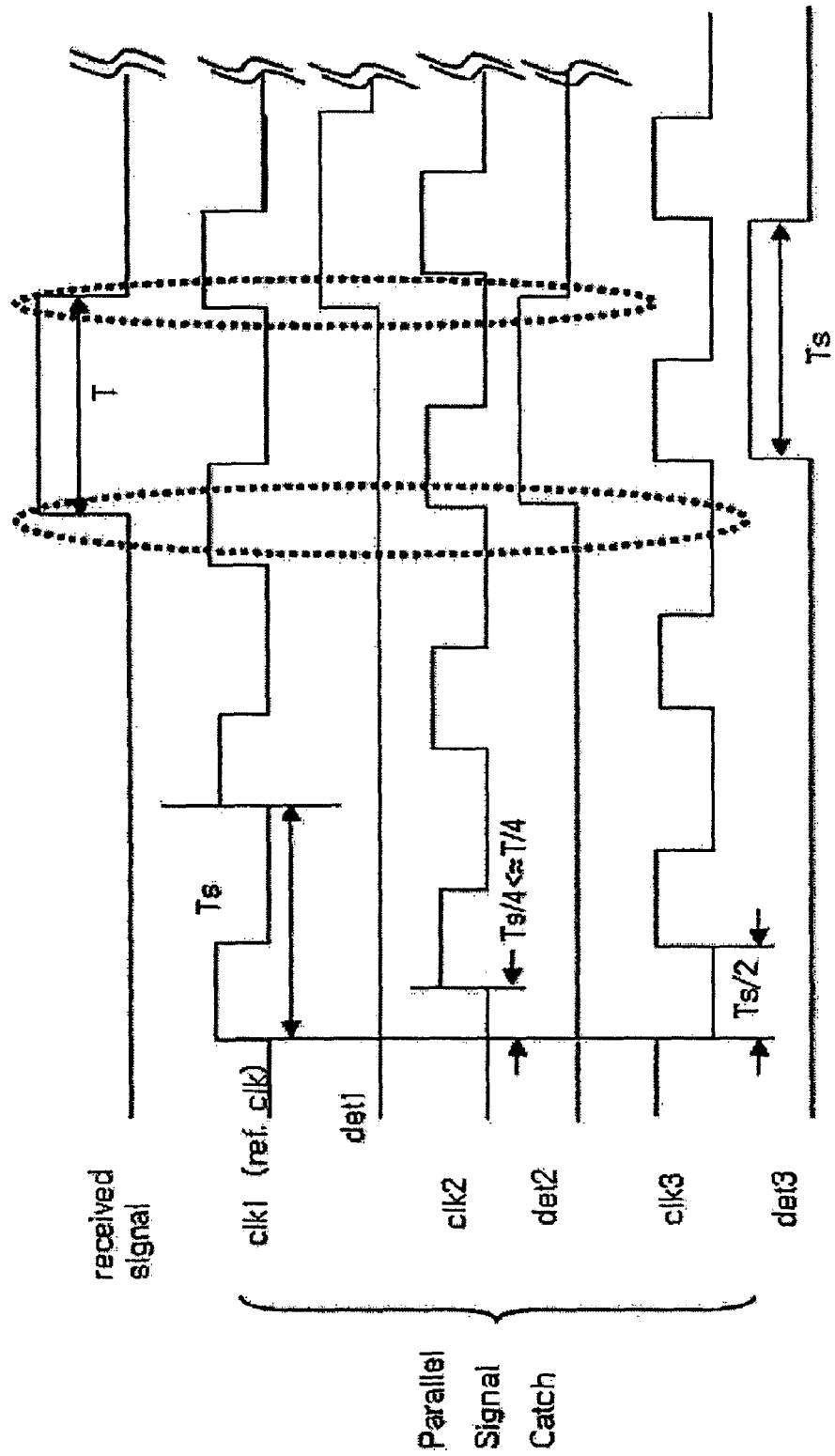
FIG. 11 is a signal sampling procedure and timing diagram for the output signal of a comparator in the 1-bit digital sampler of the IR-UWB wireless communication system according to the present invention.

FIG. 11 is a timing diagram for signal detection using high-speed clocks produced in parallel with the output signal of a comparator. If the pulse width of a received signal is T (T is less than repetitive period of impulse) and the time period of an existing clock is Ts, a delay time is set to Ts/4 to detect a signal, three clocks having a phase difference of 90 degrees relative to the existing clock are produced in parallel with each other, and the received signal is detected at the rising edge of each clock. Here, in consideration of the response time of a digital device, the delay time must be less than or equal to ½ times the pulse width of the received signal, in order to ensure that the signal is detected. The signal detected in FIG. 11 causes the first signal detector of FIG. 9 to search for the signal and to discard all values input during the next time period. The signal restoring method of the present invention may be used for a system for measuring a location using an impulse in a near range. Unlike a precision wireless positioning method that uses a conventional ADC, the method of the present invention generates parallel clocks having Giga sample per second (Gsps) performance in a digital part and search for the position of a rectangular pulse having a pulse width of several nanoseconds. In this case, the positioning resolution is related to the width of a rectangular pulse as well as the speed of the 1-bit high-speed digital sampler. A procedure of acquiring symbol synchronization using the system of the present invention will be described in detail below.

Figure 12:
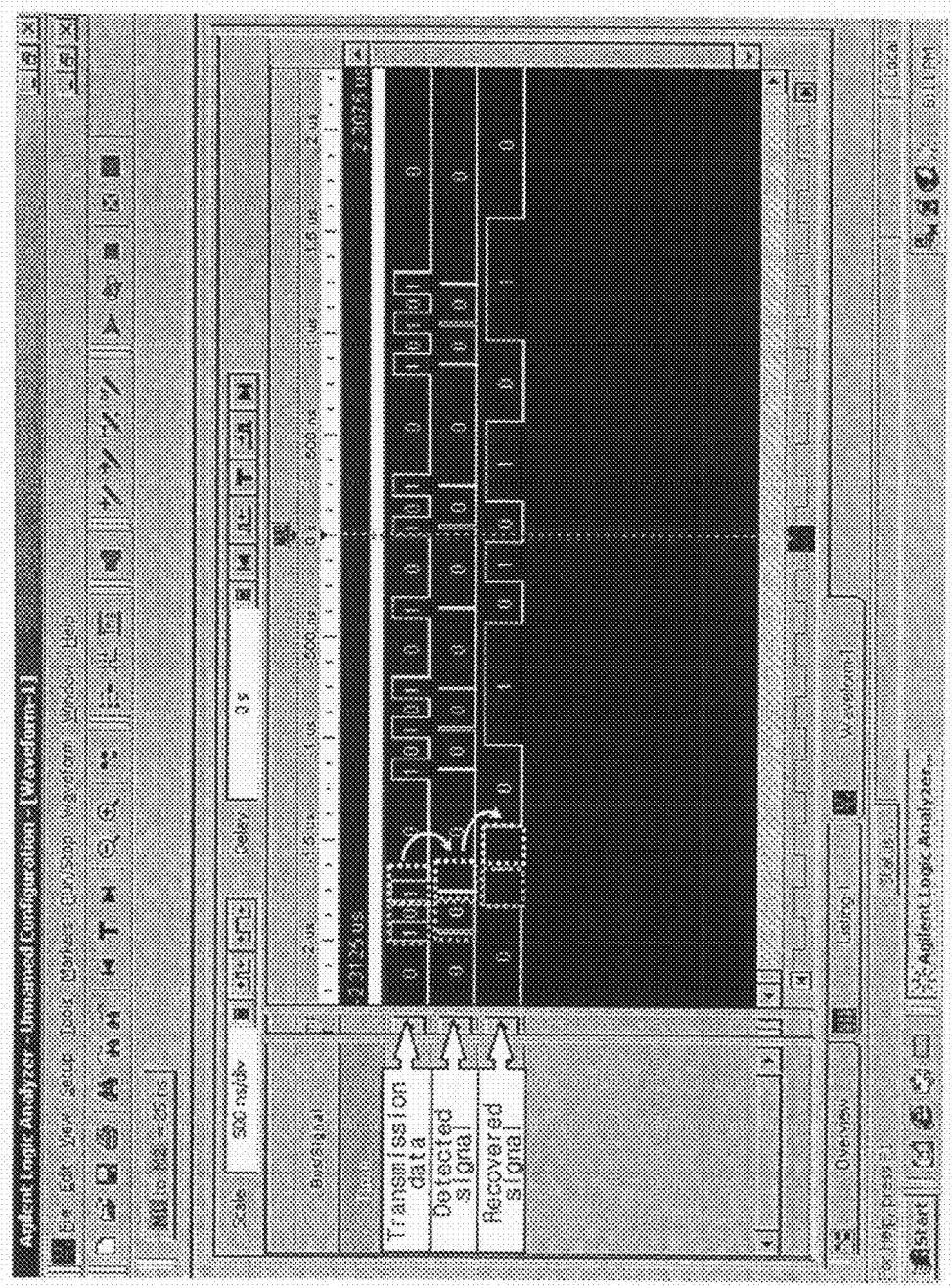
FIG. 12 is a view showing an embodiment of a procedure for recovering a signal measured using a logic analyzer in the IR-UWB wireless communication system according to the present invention.

FIG. 12 is a view showing a procedure for recovering a signal measured using a logic analyzer in the IR-UWB wireless communication system according to the present invention. A transmitting signal is an RZ signal, the pulse width of a detected signal is much less than that of the transmitting signal, and a finally recovered digital signal is a non-return to zero (NRZ) signal.

Figure 13:
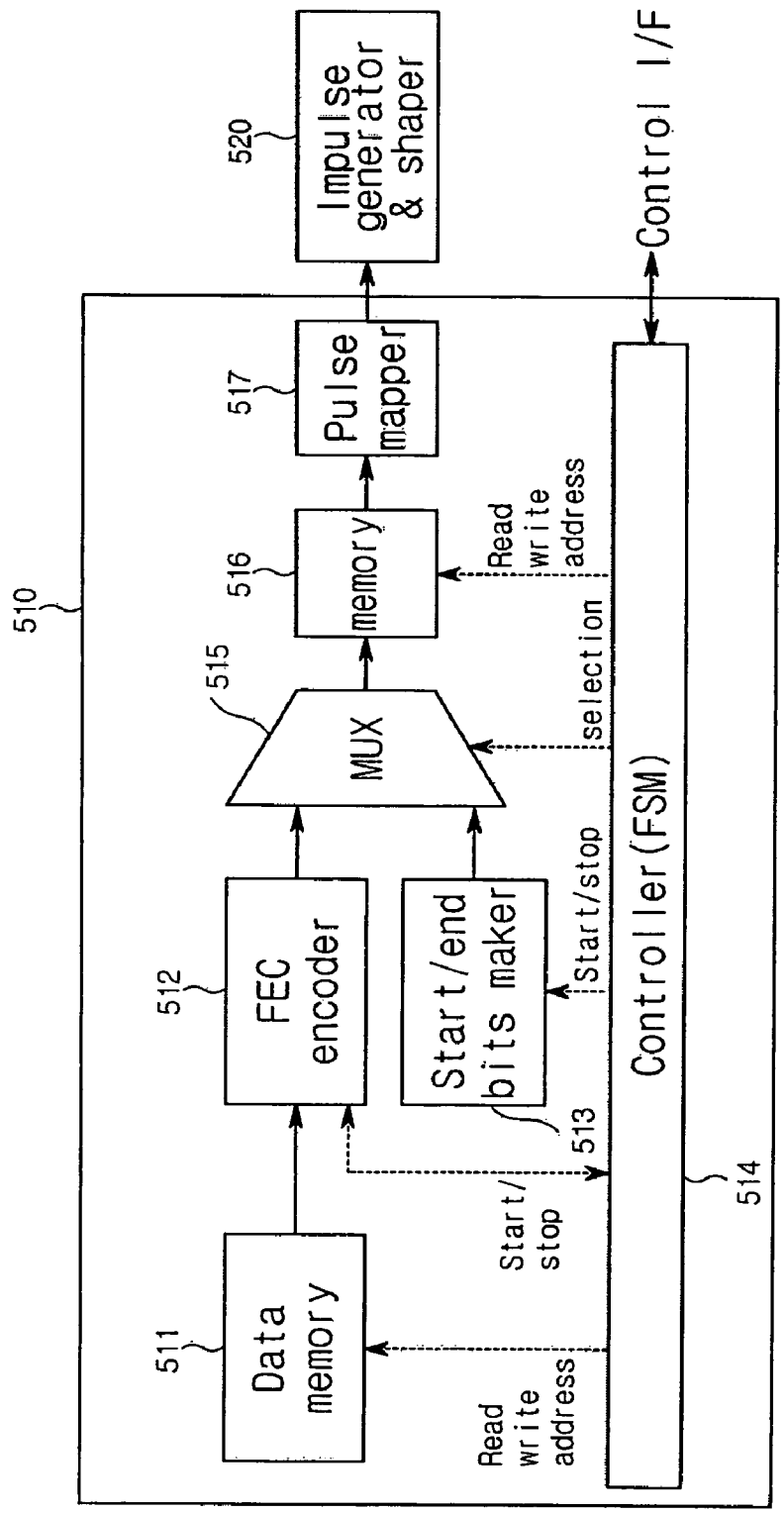
FIG. 13 is a block diagram showing the construction of the transmission signal processor of the IR-UWB wireless communication system according to the present invention.

FIG. 13 is a block diagram showing the construction of the transmission signal processor of the IR-UWB wireless communication system according to the present invention.

The transmission signal processor 510 includes transmission data memory 511, an FEC encoder 512, a start/end signal generator 513, a multiplexer (MUX) 515, a transmission memory 516, a pulse mapper 517, and a controller 514. The transmission data memory 511 temporarily stores data to be transmitted. The FEC encoder 512 is to encode the transmitting data. The start/end signal generator 513 generates start/end signals indicating the start and end of a data packet to be transmitted. The multiplexer (MUX) 515 selects data to be transmitted and control data. The transmission memory 516 stores a signal passed through the MUX 615. The pulse mapper 517 modulates data to be transmitted, which are stored in the transmission memory 516. The controller 514 generates various control signals.

Figure 14:
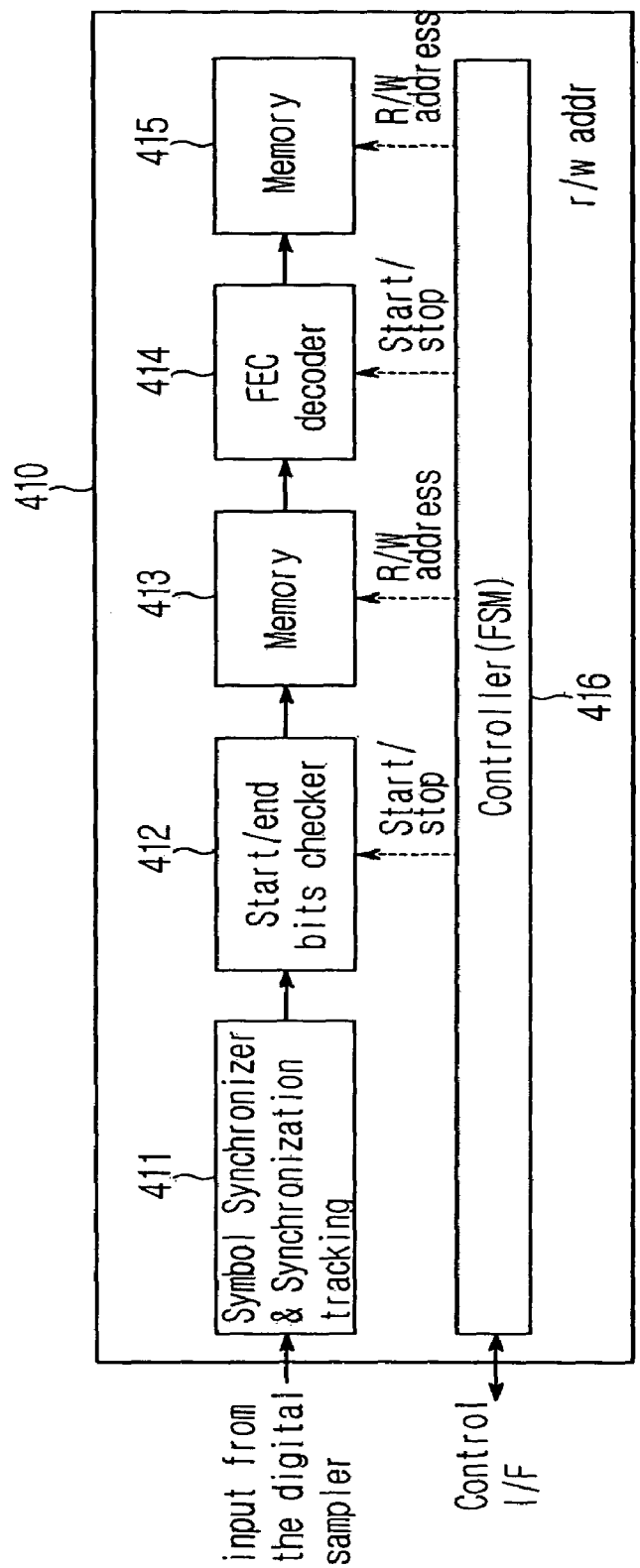
FIG. 14 is a block diagram showing the construction of the receiving signal processor of the IR-UWB wireless communication system according to the present invention.

FIG. 14 is a block diagram showing the construction of a receiving signal processor of the IR-UWB wireless communication system according to the present invention.

As in the transmission signal processor 510, the received signal is processed in real time in the receiving signal processor 410. The received signal is converted into a digital signal by the 1-bit high-speed digital sampler of the signal recovery unit 30, is synchronized and detected in the receiving signal processor 410, thereby finally obtaining the original data.

The receiving signal processor 410 includes a symbol synchronizer 411, a checker of start and end bits 412, reception data memory 413, an FEC decoder 414, and a reception memory 415. A procedure for receiving data conducted by the receiving signal processor 410 will be described in detail below. The received signal is converted into a digital signal by the one-bit high-speed digital sampler of the signal recovery unit 30, and then is subjected to signal synchronization and synchronization tracking in the symbol synchronizer 411 of the receiving signal processor 410. Next, the start/end bits checker 412 determines signals indicating the start and the end to find the start and end of the digital signal, and the reception memory 413 stores the synchronized signal. Furthermore, the FEC decoder 414 reads the data stored in the reception memory 413, decodes data encoded in the transmitting signal processor 512, and finally stores the original signal in the data memory 415. There are control signals for controlling the overall flow of a signal transfer in the receiving signal processor 410. A controller FSM (Finite State Machine) 416 for sequentially indicating changes in the control states, in which the control signals are applied to respective elements of the receiving signal processor 410.

FIG. 15 is a diagram showing an embodiment of a data transmission protocol in the IR-UWB wireless communication system according to the present invention. The upper portion of FIG. 15 shows a data transmission protocol structure when a peer-to-peer scheme is used, and the lower portion thereof shows a method of dividing and transmitting data when a multi-user scheme is used.

FIG. 16 is a sectional view showing an embodiment of an ultra wideband antenna used in the IR-UWB wireless communication system according to the present invention.

As shown in FIG. 16, the antenna can be a flat monopole antenna that is printed in a stepped pattern on a section of a printed circuit board having a sloped ground. To improve characteristics, the antenna is designed to have the sloped ground. It is preferable to use a coplanar waveguide feeding. The ultra wideband antenna is formed by inserting a triangular or rectangular transition in between the end of the feeding and the main square of the antenna so that it has wideband characteristics.

Figure 17:
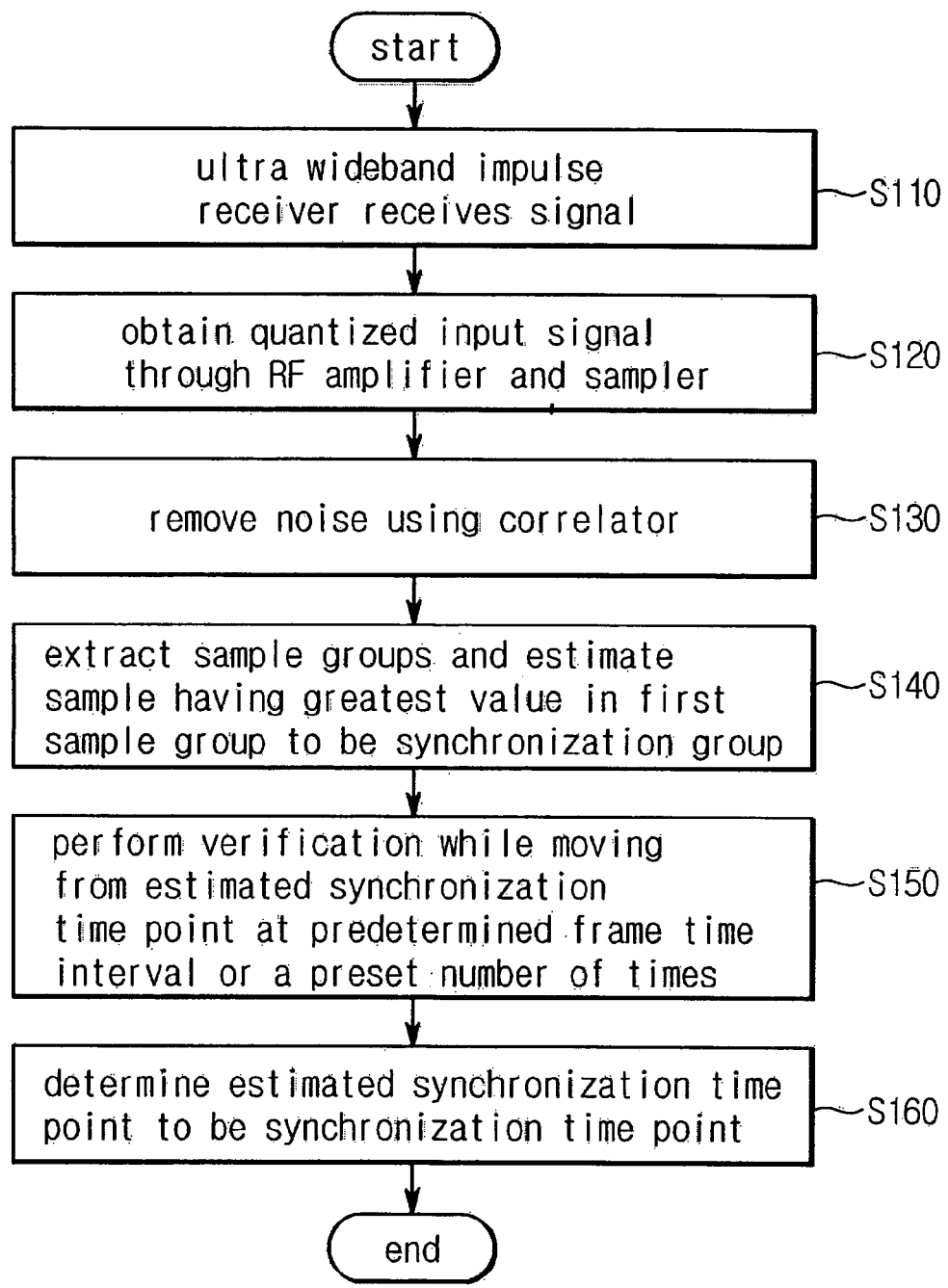
FIG. 17 is a flowchart illustrating a procedure for acquiring symbol synchronization in the ultra wideband impulse receiver of the IR-UWB wireless communication system according to the present invention.

In symbol synchronization in the communication system according to the present invention, the symbol synchronizer 411 removes noise from a quantized input signal passed through the 1-bit digital sampler, estimates a synchronization time point from the signal, and determines the synchronization time point through verification of the estimated synchronization time point. FIG. 17 is a flowchart illustrating a procedure for acquiring symbol synchronization in the ultra wideband impulse receiver of the IR-UWB wireless communication system according to the present invention.

With reference to FIG. 17, the procedure for acquiring symbol synchronization using the symbol synchronizer 411 in the communication system of the present invention will be described below. When the antenna 10 of an ultra wideband impulse receiver receives a signal at step S110, the received signal is obtained as a quantized input signal through the receiving RF module 20, including an RF amplifier, and the sampler of the signal recovery unit 30 outputs at step S120. Noise is removed from the quantized input signal by removing signals lower than a predetermined amplitude at step S130. Here, the symbol synchronizer 411 includes a correlator for increasing the SNR of the input signal, and removes the noise from the input signal using the correlator.

Next, sample groups are extracted from the signal from which noise has been removed, and the sample having the greatest value in the first of the extracted sample groups is estimated to be the synchronization time point at step S140. Through a procedure of checking whether a symbol is included within a predetermined range while moving from the synchronization time point at a predetermined frame time interval or a preset number of times at step S150, the estimated synchronization time point is determined to be the synchronization time point if the symbol is continuously included within the predetermined range or the preset number of times at step S160.

Figure 18:
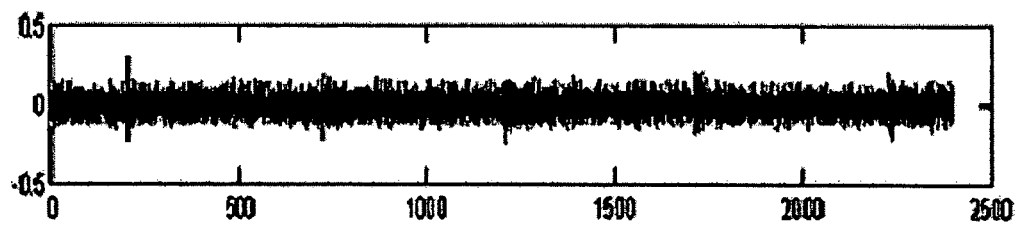
FIG. 18 to FIG. 23 are views showing signals at respective steps of the symbol synchronization achievement procedure in the ultra wideband impulse receiver of the IR-UWB wireless communication system according to the present invention.
Figure 19:
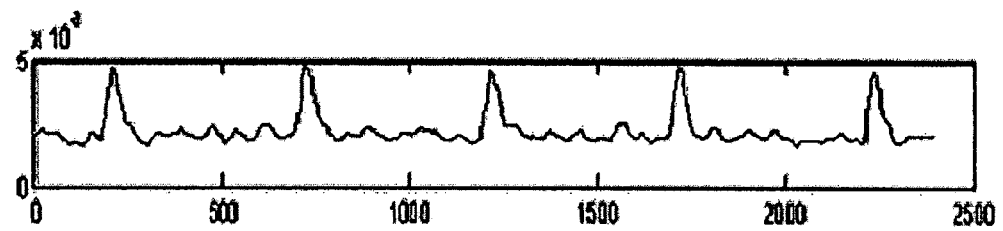
Figure 20:
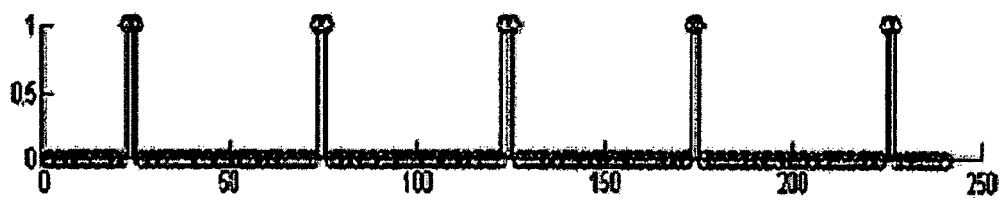

FIG. 18 to FIG. 22 are views showing embodiments of signals appearing at respective steps of the symbol synchronization acquisition procedure according to the present invention. FIG. 18 is a view showing a waveform received via an impulse propagation channel, the waveform including an impulse signal and noise. When the received signal passes through the BPF 210, LNA 220, and envelope detector 230 of FIG. 6, a low-frequency signal shown in FIG. 19 is acquired. FIG. 20 is a view showing a signal that is obtained by sampling the output of the comparator and quantizing it to 1 bit through a 1-bit digital sampler according to the present invention. Here, the obtained digital signal $\tilde{r}(n)$ includes only '0' and '1' and becomes a quantized input signal so as to achieve symbol synchronization. In particular, in the synchronization acquisition period, transmitting data bits whose number is equal to that of bits determined in the system and which have value "1" are transmitted.

Respective steps of the synchronization acquisition procedure for the quantized input signal will be described in detail below.

First, noise is removed from a quantized input signal. In order to increase the SNR of the $\tilde{r}(n)$ quantized by the 1-bit digital sampler, a signal lower than a predetermined amplitude is removed using a simplified correlator that is simplified as illustrated in the following Equation 1, $$\tilde{r}_m(n) = t(n) \cdot \{\tilde{r}(n) \otimes m(n)\} \qquad (1)$$

$$\begin{cases} m(n) = 1, & 0 \leq n \leq N_m \\ = 0, & \text{otherwise} \end{cases}$$

$$\begin{cases} t(n) = 1, & \text{if } (\tilde{r}(n) \otimes m(n)) \geq T_h \\ = 0, & \text{otherwise} \end{cases}$$

where m(n) is a rectangular correlator having a size of 1, $N_m$ is the width of the filter, $T_h$ is a threshold value for determining the removal of noise components, and the notation $\langle \otimes \rangle$ denotes the convolution product.

Here, the correlator has a rectangular shape having a size of 1, and the width $N_m$ of a filter can be suitably set according to the channel state and the transmission pulse signal. It is preferred that a threshold value $T_h$ for removing a noise component is 1.5 times the average noise.

Figure 21:
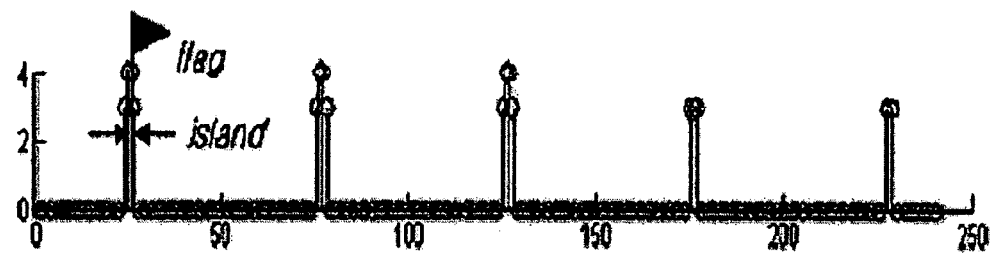

When the noise is removed from the quantized input signal, the signal shown in FIG. 21 is acquired. From FIG. 21, it is ascertained that a sample group is formed as the result of the removal of noise from the input signal using the correlator.

After the noise has been removed from the quantized input signal, a synchronization time point is estimated. A group of samples having an independent or continuous value higher than zero in the input signal $\tilde{r}_m(n)$ from which the noise is removed, which is shown in FIG. 21, is defined as an 'island', the sample having the greatest value in each sample group 'island' according to the following Equation 2 is defined as a 'flag', and the index flag $n_{flag,1}$ of the first island is estimated as a synchronization time point, $$BDW_i = [BDW_{cen,i} - N_{BDW}/2, BDW_{cen,i} + N_{BDW}/2] \qquad (2)$$

where $BDW_{cen,i} = n_{flag,1} + i \cdot N_f (i=1, 2, \ldots, N_i)$.

Thereafter, a procedure for verifying the estimated synchronization time point is performed. In order to verify the estimated synchronization time point, a bit decision window (BDW) having a predetermined $N_{BDW}$ width is defined based on a time point of $(n_{flag,1} + i \cdot N_f)$, that is a predetermined frame time $i \cdot N_f$ after the estimated synchronization time point $n_{flag,1}$, and it is checked whether there is a symbol having a value higher than zero in each BDW while the center $BDW_{cen,i}$ of the $BDW_i$ is moved to a time point of a preset number of $N_i$ times a frame interval $N_f$.

Figure 22:
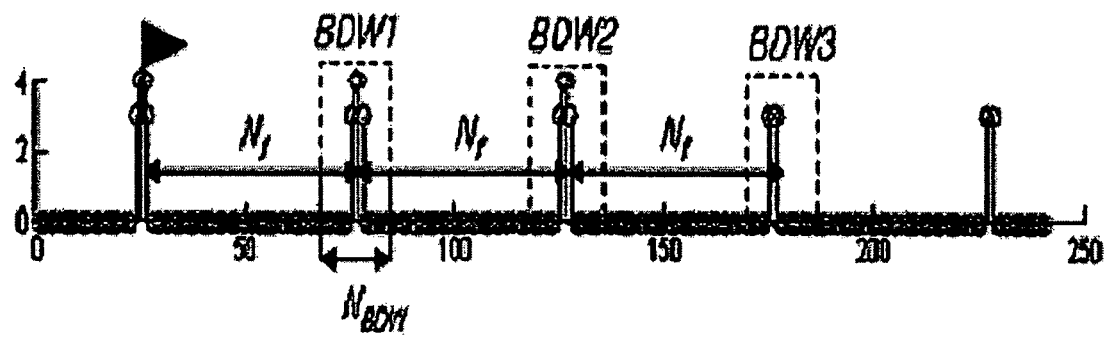

This will be described with reference to FIG. 22. A BDW having a width $N_{BDW}$ centered around $n_{flag,2}$ which is the index 'flag' of the next sample group coming a frame time $N_f$ after the index 'flag' of the first 'island,' which is an estimated synchronization time point, is defined as 'BDW1'. The BDW coming after the next frame time $N_f$ is defined as 'BDW2' in the same manner. In the same manner, whether or not a value, that is, a symbol (pulse) higher than zero, is included in the BDW is checked while movement is performed up to a preset number of times $N_i$.

If a continuous symbol having a value higher than zero is continuously found in the BDW for a preset number of $N_i$, the $n_{flag,1}$ estimated as the synchronization time point is regarded as an exact synchronization time point $n_{acq}$ and the synchronization acquisition is terminated.

Otherwise, the procedure for estimating the synchronization time point and the procedure for verifying the estimated synchronization time point are repeated from the next sample to the time of synchronization acquisition so as to search for the exact synchronization time point. Here, it is preferred that the repetition number of $N_i$ is between 3 and 6.

As the width $N_{BDW}$ of BDW decreases, precise synchronization is realized. However, as the width $N_{BDW}$ of BDW decreases, it is sensitive to changes in the environment, such as a wireless channel, noise, or timing jitter. This has an advantage in that it is insensitive to environmental changes as the width $N_{BDW}$ of BDW increases. However, because the noise component increases, a bit error rate (BER) increases. The signal received from the antenna 10 passes through the band-pass filter 210, the low noise amplifier 220, and the envelope detector 230, and is then sampled by the 1-bit digital sampler of the signal recovery unit 30. Since sampling is necessary in a BDW period after symbol synchronization acquisition and the power consumption in the 1-bit digital sampler is closely related to the size of the $N_{BDW}$, it is preferred that the size of the $N_{BDW}$ becomes as short as possible for low power consumption.

When symbol synchronization acquisition is successfully achieved in a symbol synchronization acquisition procedure in the communication system of the present invention, the BDW in every frame period based on a synchronization acquisition time point $n_{acq}$ is reset in order to identify data (0 or 1) in the BDW. Furthermore, in order to lower the bit error rate (BER), signals less than a predetermined size are removed from signals in the BDW using a simple correlator and a correlating value.

However, although precise symbol synchronization is achieved, transmission and reception time periods are varied during the transmission of data or a radio channel environment can change at any time, so that it is necessary to periodically track the symbol synchronization time point.

Figure 23:
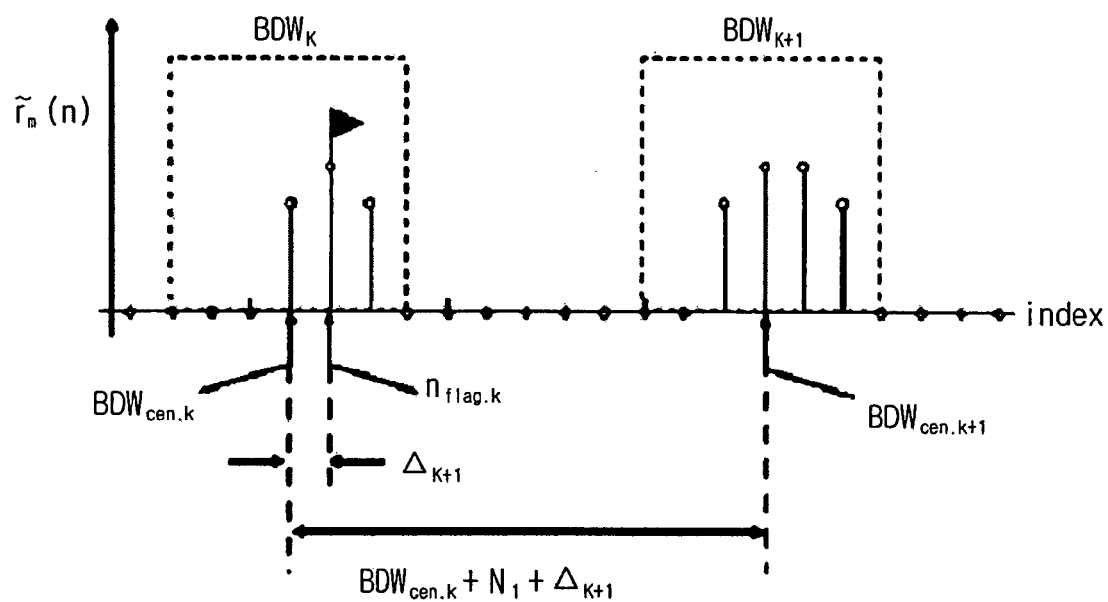

FIG. 23 is a view showing a symbol synchronization tracking procedure using a BDW according to the present invention. As shown in FIG. 23, $BDW_{cen,1st}$ for a first symbol after the time period of synchronization is determined based on a synchronization time $n_{acq}$ and satisfies the following Equation 3, $$BDW_{cen,1st} = n_{acq} + \alpha \cdot N_f \quad (3)$$

where $\alpha$ is the total number of symbols in a synchronization acquisition time period. A center $BDW_{cen,k+1}$ of $BDW_{k+1}$ for the $(k+1)^{th}$ symbol is determined based on the previous $BDW_{cen,k}$ time point and an offset $\Delta_{k+1}$ and satisfies the following Equation 4, $$BDW_{cen,k+1} = (BDW_{cen,k} + N_f) + \Delta_{k+1} \quad (4)$$

where $\Delta_{k+1} = n_{flag,k} - BDW_{cen,k}$. The offset $\Delta_{k+1}$ of the $(k+1)^{th}$ symbol is defined as the difference between a sample index $n_{flag,k}$ having the greatest value in the $k^{th}$ window $BDW_k$ and a center index $BDW_{cen,k}$ of the $BDW_k$. When the sample index $n_{flag,k}$ is not found because no symbol is present in the $k^{th}$ sample group, the offset $\Delta_{k+1}$ is regarded as zero. For example, in the case where an OOK modulation method is used, the offset of a subsequent $BDW_{k+1}$ varies only when there is a previous symbol. The reason for this is to realize effective tracking without additional signals.

When the symbol synchronization is acquired and BDW is set for each symbol through the next synchronization tracking, a bit can be identified in each BDW. That is, when a sample higher than zero is present in the BDW for the signal $\tilde{r}_m(n)$, it is determined that the signal $\tilde{r}_m(n)$ is "1(ON)", and, if only zero is present in the BDW, it is determined that the signal $\tilde{r}_m(n)$ is "0(OFF)".

As described above, the receiver of an impulse system according to the present invention simplifies an overall system using a 1-bit digital sampler instead of a prior art high-speed ADC to restore a digital signal and then reduces power consumption. Further, signal synchronization acquisition and tracking techniques using bit decision windows simplify a signal processor and minimize power consumption since the synchronization is performed by detecting the symbol in each BDW, not by synchronizing the exact time point of a symbol which is using a very complex phase locked-loop circuit.

In the present invention described above, an overall system may be simplified and power consumption may be reduced through signal synchronization and tracking techniques using a 1-bit high-speed digital sampler for restoring an analog rectangular pulse to a signal and a bit decision window.

Furthermore, using an impulse generation method implemented using only digital logic circuits for converting data into impulse signals in a transmitting system, the construction of a transmitter is simplified and power consumption is reduced for an IR-UWB communication system.

The system can be used in the control of home network appliances, sensor networks, low power UWB-RFID, and intermediate-low data rate local area personal communication devices.

Finally, a signal processing configuration for the entire system is provided, so that an IR-UWB communication system having intermediate-low data rate, low power consumption, and low complexity can be developed. The system can be used in the control of home network appliances, sensor networks, low power UWB-RFID, and intermediate-low data rate local area personal communication devices.

Although the IR-UWB communication system using a 1-bit digital sampler and a bit decision window according to the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An impulse radio-based ultra wideband communication system using an ultra wideband impulse and a 1-bit digital sampler, comprising:
   a transmitting RF module comprising an integrated impulse generator capable of implementing on-off-keying modulation or pulse position modulation, and an amplifier for amplifying output of the integrated impulse generator;
   a receiving RF module comprising a two stage envelope detector for detecting an envelope of a received signal and a comparator for converting the detected signal into a rectangular pulse;
   a digital signal recovery unit for restoring the signal from the receiving RF module to a digital signal using the 1-bit digital sampler;
   a transmitting signal processor for impulse modulation or pulse mapping;

a receiving signal processor for synchronizing the digital signal and tracking symbol synchronization; and an ultra wideband antenna for transmitting and receiving an ultra wideband impulse signal.

2. The impulse radio-based ultra wideband communication system as set forth in claim 1, wherein the 1-bit digital sampler comprises a clock generator having a time delay component and a pulse detector for detecting the rectangular pulse, wherein the clock generator generates a sequence of clock signals in parallel equally phased from each other from a system clock by gradually delaying the system clock and the pulse detector detects the rectangular pulse by applying the sequence of clock signals to the rectangular pulse.

3. The impulse radio-based ultra wideband communication system as set forth in claim 2, wherein the clock generator includes a time delay or phase conversion element, and generates a plurality of system clocks having a predetermined time difference/phase difference therebetween, wherein the plurality of system clocks are arranged in parallel.

4. The impulse radio-based ultra wideband communication system as set forth in claim 1, wherein the integrated impulse generator of the transmitting RF module comprises:
   a D latch for receiving n bits of data to be transmitted through at least one input terminal;
   an AND gate for performing an AND operation on an output signal of the D latch and a signal obtained by delaying the output signal of the D latch by a predetermined time; and
   an inverter chain for performing current driving in order to prevent distortion of the output signal of the D latch.

5. The impulse radio-based ultra wideband communication system as set forth in claim 4, wherein the D latch outputs an impulse signal each time a data signal is present by fixing one input terminal to digital logic value 'HIGH' when data to be transmitted is applied to another input terminal.

6. The impulse radio-based ultra wideband communication system as set forth in claim 1, wherein the receiving RF module comprises:
   a wideband band-pass filter for preventing interference of adjacent frequencies among signals received from the ultra wideband antenna;
   a low noise amplifier for low-noise-amplifying a filtered signal passed through the wideband band-pass filter;
   an active attenuator for controlling amplitude of the amplified signal from the low noise amplifier; and
   an automatic gain control amplifier for amplifying a signal passed through the active attenuator,
   wherein the two-stage envelope detector for converting the RF signal, amplified by the automatic gain control amplifier, into the rectangular pulse.

7. The impulse radio-based ultra wideband communication system as set forth in claim 1, wherein the transmitting signal processor comprises:
   transmission data memory for temporarily storing data to be transmitted;
   a forward error correction encoder for performing forward error correction encoding;
   a start/end bits generator for generating start/end signals indicating a start and end of a data packet to be transmitted;
   a multiplexer for selecting data to be transmitted and control data;
   transmission memory for storing data from the multiplexer; and
   a pulse mapper for performing OOK or PPM modulation and transforming a waveform of receiving data into a waveform suitable for the input of the impulse generator.

8. The impulse radio-based ultra wideband communication system as set forth in claim 7, wherein the transmitting signal processor further comprises a controller for applying a control signal to respective elements so as to control a transfer flow of the entire signal.

9. The impulse radio-based ultra wideband communication system as set forth in claim 1, wherein the receiving signal processor comprises:
   a symbol synchronizer for processing signal synchronization and synchronization tracking for the digital signal recovered by the signal recovery unit;
   a start/end bits checker for checking a start and end of transmitted data;
   receiving data memory for storing the transmitted data;
   a forward error correction decoder for decoding the signal encoded in the transmitting signal processor; and
   receiving memory for storing recovered original data.

10. The impulse radio-based ultra wideband communication system as set forth in claim 9, wherein the receiving signal processor further comprises a controller for applying a control signal to respective elements so as to control transfer flows of the entire signals.

11. The impulse radio-based ultra wideband communication system as set forth in claim 1, wherein the ultra wideband antenna is a square monopole antenna, which is printed in a stepped pattern on a section of a printed circuit board having a sloped ground surface, and has a coplanar waveguide feeding structure.

12. The impulse radio-based ultra wideband communication system as set forth in claim 11, wherein the ultra wideband antenna is formed by inserting a triangular or rectangular transition in a power feed portion so that it has wideband characteristics.

13. The impulse radio-based ultra wideband communication system as set forth in claim 9, wherein:
   the digital sampler of the signal recovery unit is a 1-bit digital sampler; and
   the symbol synchronizer performs:
   a first step of removing noise present in a quantized input signal passed through the 1-bit digital sampler,
   a second step of estimating a synchronization time point in the signal from which noise has been removed, and
   a third step of determining the synchronization time point by verifying the estimated synchronization time point,
   thereby achieving symbol synchronization of an input signal through the respective steps.

14. The impulse radio-based ultra wideband communication system as set forth in claim 13, wherein:
   the symbol synchronizer comprises a correlator for increasing a signal to noise ratio of the quantized input signal of the 1-bit digital sampler;
   the first step is to remove a signal lower than a predetermined amplitude from the quantized input signal using the correlator;
   the second step is to extract sample groups from the signal from which noise has been removed; to search for a sample having a greatest value in a first of the extracted sample groups; and to estimate the searched sample to be the synchronization time point; and
   the third step is to define a bit decision window in each symbol and to accept the estimated synchronization time point as the synchronization time point through a verification process for testing whether the symbol is included within a predetermined range while moving the bit decision window from the estimated synchronization time point to a time point of a preset number times a predetermined frame time.

15. The impulse radio-based ultra wideband communication system as set forth in claim 14, wherein the correlator is m(n) which satisfies the following equation (1), and the first step is to remove a signal lower than a predetermined amplitude from the quantized input signal $\tilde{r}(n)$ using the correlator m(n) in order to increase a signal to noise ratio of the signal $\tilde{r}(n)$ quantized by the 1-bit digital sampler, $$\tilde{r}_m(n) = t(n) \cdot \{\tilde{r}(n) \otimes m(n)\} \quad (1)$$

$$\begin{cases} m(n) = 1, & 0 \leq n \leq N_m \\ = 0, & \text{otherwise} \end{cases}$$

$$\begin{cases} t(n) = 1, & \text{if } (\tilde{r}(n) \otimes m(n)) \geq T_h \\ = 0, & \text{otherwise} \end{cases}$$

where m(n) is a rectangular correlator having a size of 1, $N_m$ is a width of a filter, $T_h$ is a threshold value for removing noise components, and the notation $<\otimes>$ denotes the convolution product.

16. The impulse radio-based ultra wideband communication system as set forth in claim 15, wherein the second step is to define a sample group, having an independent or continuous value higher than zero in the signal $\tilde{r}_m(n)$ from which noise has been removed, as 'island'; to calculate a sample having a greatest value in each sample group 'island' and define the sample as 'flag'; and to estimate an index $n_{flag,1}$ of a sample 'flag' having the greatest value in the 'island' of the first of the sample groups to be the synchronization time point.

17. The impulse radio-based ultra wideband communication system as set forth in claim 16, wherein the third step is to define a bit decision window having a predetermined width $N_{BDW}$ centered around a time point of $(n_{flag,1}+i \cdot N_f)$, that is, a predetermined frame time $i \cdot N_f$ after the estimated synchronization time point $n_{flag,1}$; to check whether there is a symbol having a value higher than zero in each BDW while moving the center $BDW_{cen,i}$ of the BDW to a time point of a preset number of $N_i$ times a frame interval $N_f$ according to the following Equation (2); and to regard the estimated $n_{flag,1}$ to be an exact synchronization time point $n_{acq}$ when there is a continuous symbol having a value higher than zero in the BDW, $$BDW_i = [BDW_{cen,i} - N_{BDW}/2, BDW_{cen,i} + N_{BDW}/2] \quad (2)$$

where $BDW_{cen,i} = n_{flag,1} + i \cdot N_f$ (i=1, 2, ..., $N_i$).

18. The impulse radio-based ultra wideband communication system as set forth in claim 17, wherein a center $BDW_{cen,i}$ of the $BDW_i$ is moved to a time point of a preset number of $N_i$ times a frame interval $N_f$, and, when only zero is present in any one BDW, the second step and the third step are repeatedly performed from a next sample to a time at which synchronization is achieved.

19. The impulse radio-based ultra wideband communication system as set forth in claim 18, wherein $BDW_{cen,1st}$ for the first symbol after a time period for synchronization acquisition is determined based on a synchronization acquisition time $n_{acq}$ and satisfies the following Equation (3), a center $BDW_{cen,k+1}$ of $BDW_{k+1}$ for the $(k+1)^{th}$ symbol is determined based on a previous time point $BDW_{cen,k}$ and an offset $\Delta_{k+1}$ and satisfies the following Equation (4), the offset $\Delta_{k+1}$ being a difference between a sample index $n_{flag,k}$ having a greatest value in the Kth window $BDW_k$ and the center index $BDW_{cen,k}$ of the window $BDW_k$, and the acquired synchronization is tracked using the $BDW_{cen,1}$ and the $BDW_{cen,k+1}$, $$BDW_{cen,1st} = n_{acq} + \alpha \cdot N_f \quad (3)$$

where $\alpha$ is the total number of symbols in a synchronization acquisition time period, $$BDW_{cen,k+1} = (BDW_{cen,k} + N_f) + \Delta_{k+1} \quad (4)$$

where $\Delta_{k+1} = n_{flag,k} - BDW_{cen,k}$.

20. The impulse radio-based ultra wideband communication system as set forth in claim 19, wherein the offset $\Delta_{k+1}$ is regarded as zero if the sample index $n_{flag,k}$ is not found because no symbol is present in the $k^{th}$ sample group.

21. The impulse radio-based ultra wideband communication system as set forth in claim 20, wherein the symbol synchronization is achieved, and the BDW is set for each symbol through subsequent synchronization tracking, and a bit is identified in each BDW in such a way that, when a sample other than zero is present in the BDW for the signal $\tilde{r}_m(n)$, it is determined that the signal $\tilde{r}_m(n)$ is "1(ON)", and, if only zero is present in the BDW, it is determined that the signal $\tilde{r}_m(n)$ is "0(OFF)".

* * * * *